United States Patent [19]

Shaw et al.

[11] Patent Number: 4,859,016
[45] Date of Patent: * Aug. 22, 1989

[54] FIBER OPTIC AMPLIFIER

[75] Inventors: Herbert J. Shaw, Stanford; Michel J. F. Digonnet, Palo Alto, both of Calif.

[73] Assignee: The Board of Trustees of the Leland Stanford Junior University, Stanford, Calif.

[*] Notice: The portion of the term of this patent subsequent to Nov. 19, 2002 has been disclaimed.

[21] Appl. No.: 137,870

[22] Filed: Dec. 22, 1987

Related U.S. Application Data

[62] Division of Ser. No. 930,136, Nov. 12, 1986, Pat. No. 4,723,824, which is a division of Ser. No. 554,888, Nov. 25, 1983, Pat. No. 4,674,830.

[51] Int. Cl.$^4$ .......................... G02B 6/26; H01S 3/07
[52] U.S. Cl. .................. 350/96.15; 330/4.3; 372/6; 372/69
[58] Field of Search .......... 350/96.15, 96.16; 372/6, 69, 94; 330/4, 4.3, 5, 84, 85

[56] References Cited

U.S. PATENT DOCUMENTS

| | | | |
|---|---|---|---|
| 3,230,474 | 1/1966 | Keck et al. | 331/94.5 |
| 3,456,211 | 7/1969 | Koester | 372/6 |
| 3,731,225 | 5/1973 | Wild et al. | 372/6 |
| 3,753,145 | 8/1973 | Chesler | 372/75 |
| 3,902,130 | 8/1975 | Pike | 330/4.3 |
| 3,914,709 | 10/1975 | Pike et al. | 372/30 |
| 3,957,341 | 5/1976 | Taylor | 350/96.15 |
| 3,975,692 | 8/1976 | Mego, Jr. et al. | 372/26 |
| 4,136,929 | 1/1979 | Suzaki | 350/96.15 |
| 4,243,297 | 1/1981 | Elion | 350/96.15 |
| 4,258,336 | 3/1981 | Fletcher et al. | 372/6 |
| 4,300,811 | 11/1981 | Ettenberg et al. | 350/1.1 |
| 4,301,543 | 11/1981 | Palmer | 455/612 |
| 4,307,933 | 12/1981 | Palmer et al. | 350/96.16 |
| 4,315,666 | 2/1982 | Hicks, Jr. | 350/96.15 |
| 4,335,933 | 6/1982 | Palmer | 350/96.19 |
| 4,342,499 | 8/1982 | Hicks, Jr. | 350/96.15 |
| 4,343,532 | 8/1982 | Palmer | 350/96.19 |
| 4,362,359 | 12/1982 | Dammann et al. | 350/96.19 |
| 4,383,318 | 5/1983 | Barry et al. | 372/6 |
| 4,515,431 | 5/1985 | Shaw et al. | 350/96.15 |
| 4,546,476 | 10/1985 | Shaw et al. | 372/6 |
| 4,553,238 | 11/1985 | Shaw et al. | 372/6 |
| 4,554,510 | 11/1985 | Shaw et al. | 330/4.3 |
| 4,603,940 | 8/1986 | Shaw et al. | 350/96.15 |
| 4,674,830 | 6/1987 | Shaw et al. | 350/96.15 |
| 4,723,824 | 2/1988 | Shaw et al. | 350/96.15 |

FOREIGN PATENT DOCUMENTS

| | | |
|---|---|---|
| 0038023 | 10/1981 | European Pat. Off. |
| 0112090 | 6/1984 | European Pat. Off. |
| 1439469 | 11/1968 | Fed. Rep. of Germany |
| 53-91752 | 11/1978 | Japan ............ 350/96.15 |
| 55-76308 | 6/1980 | Japan |
| 57-85004 | 5/1982 | Japan |
| 1094639 | 12/1967 | United Kingdom |

OTHER PUBLICATIONS

Kapany et al., "Coherent Interactions Between Optical Waveguides . . . ", *J.O.S.A.*, vol. 58, No. 9, Sep. 1968.

(List continued on next page.)

*Primary Examiner*—John D. Lee
*Attorney, Agent, or Firm*—Knobbe, Martens, Olson & Bear

[57] ABSTRACT

An amplifier for use with fiber optic systems comprises a neodymium YAG crystal placed in series with a signal-carrying optical fiber. The ND:YAG crystal is supplied by the optical fiber with both the signal to be amplified, and pumping illumination. The pumping illumination is coupled onto the optical fiber by a multiplexing coupler which is used to combine the signal to be amplified and illumination from a pumping illumination source onto a single optical fiber. The pumping illumination inverts the neodymium ions within the ND:YAG crystal. The signal to be amplified propagates through this crystal to stimulate emission of coherent light from the neodymium ions, resulting in amplification of the signal. Because this arrangement permits the ND:YAG crystal to be end-pumped with pumping illumination, and because the length of the ND:YAG crystal may be substantially greater that the absorption length for the crystal at the wavelength of the pumping illumination, virtually all of the pumping illumination may be absorbed within the ND:YAG crystal and used for amplification of the signal carried by the optical fiber.

15 Claims, 5 Drawing Sheets

OTHER PUBLICATIONS

Burrus et al., "Single-Crystal Fiber Optical Devices: A Nd:YAG Fiber Laser", *Appl. Phys. Lett.*, vol. 26, No. 6, Mar. 15, 1975, pp. 318–320.

Bergh et al., "Single Mode Fiber Optic Directional Coupler", *Electronics Letters*, vol. 16, No. 7, Mar. 27, 1980, pp. 260–261.

Periasamy et al., "Laser Amplification in an Optical Fiber by Evanescent Field Coupling", *Appl. Physics*, vol. 24, No. 3, Mar. 1981, pp. 201–203.

Digonnet et al., "Analysis of a Tunable Single Mode Optical Fiber Coupler", *IEEE J.Q.E.*, vol. QE-18, No. 4, Apr. 1982.

Injeyan et al., "Light Amplification by Evanescent Wave Coupling in a Multimode Fiber", *Appl. Optics*, vol. 21, No. 11, Jun. 1982, pp. 1928–1932.

Alferov et al., "Multichannel Duplex Fiber-Optic Communication Line . . . ", *Soviet J. Quant. Electr.*, vol. 12, No. 8, Aug. 1982, pp. 1088–1090.

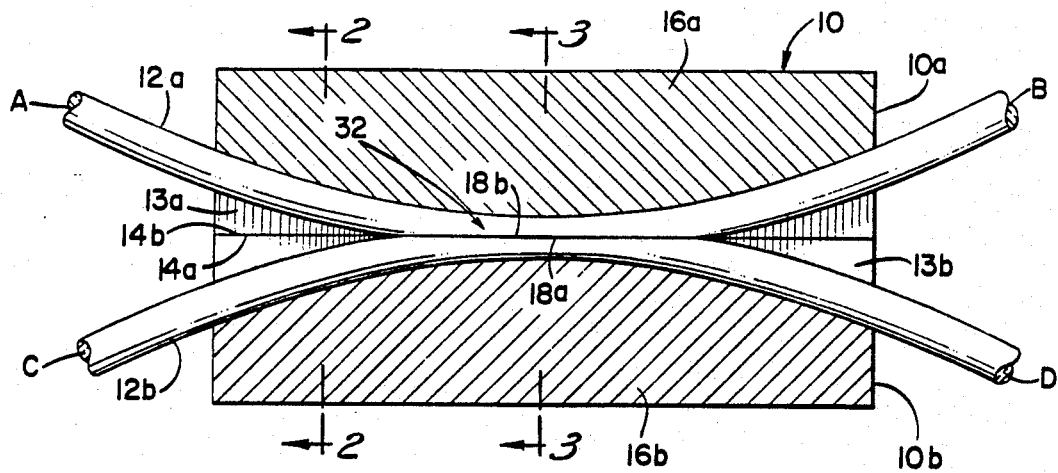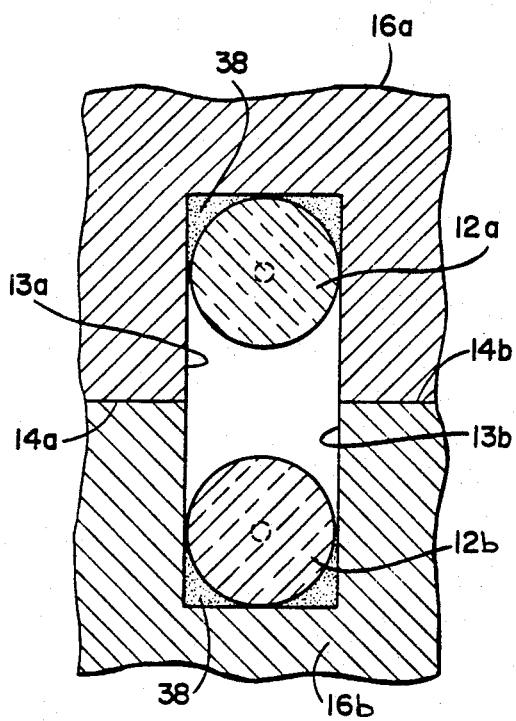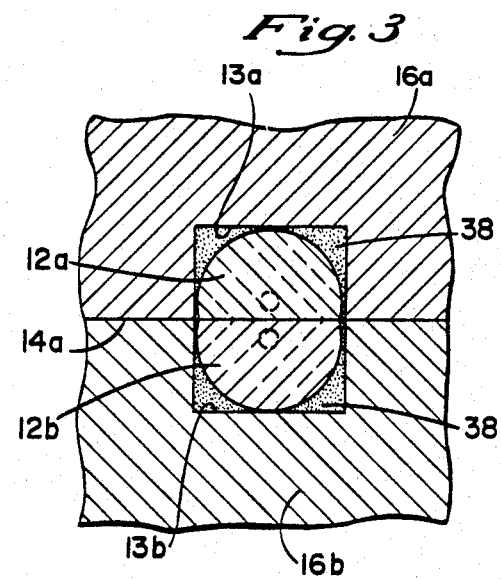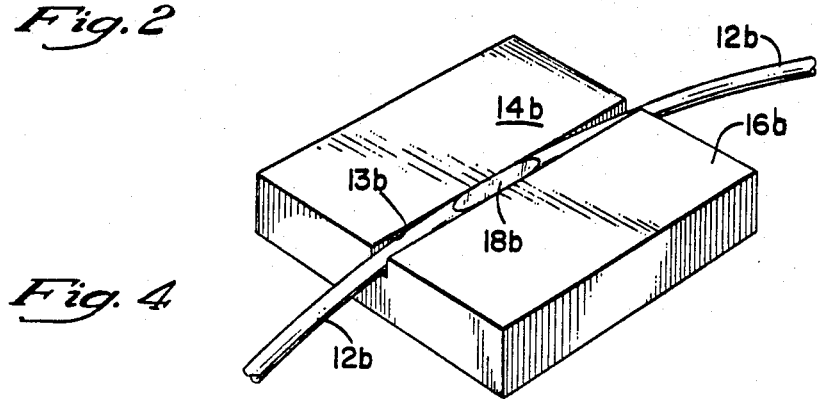

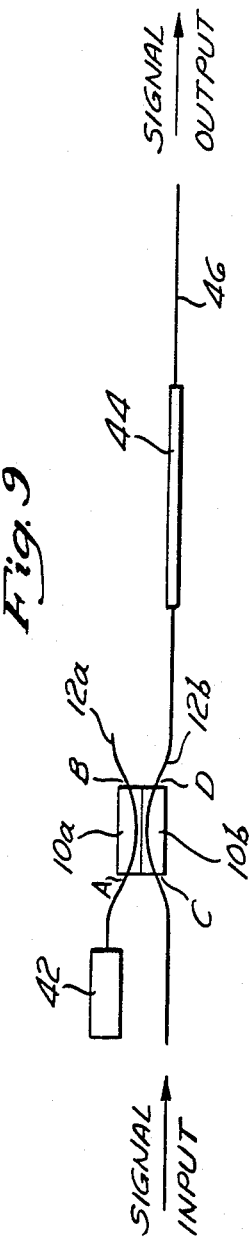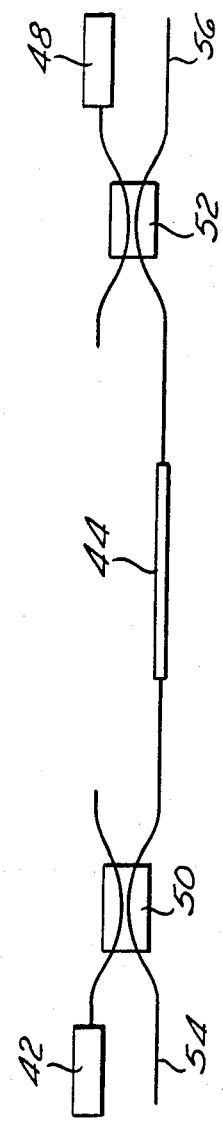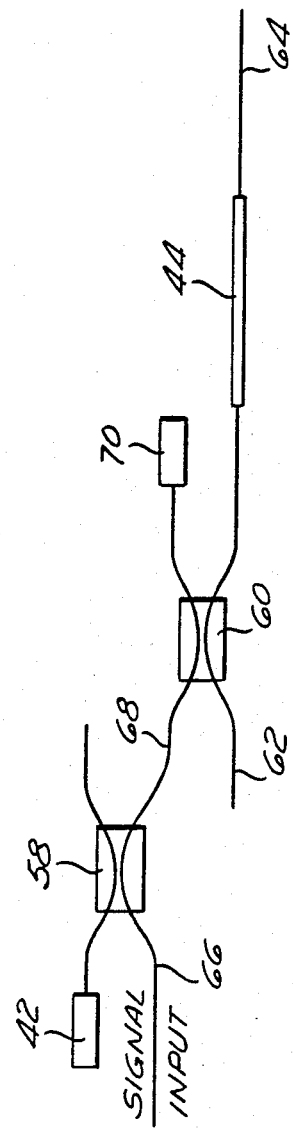

FIBER OPTIC AMPLIFIER

This application is a division of application Ser. No. 930,136, filed Nov. 12, 1986 U.S. Pat. No. 4,723,824, which is a division of application Ser. No. 554,888 filed Nov. 25, 1983, now issued as U.S. Pat. No. 4,674,830.

BACKGROUND OF THE INVENTION

The concept of optical amplifiers, based upon the capability of certain materials, particularly on a macroscopic level, is well known. Thus, for example, it is known to place a pumping light source and a single crystal neodymium-yttrium aluminum garnet (ND:YAG) rod, several millimeters in diameter and several centimeters in length, in a tubular reflective cavity. For example, the light source and ND:YAG rod may be located, respectively, to extend along the two foci of a cavity having an elliptical cross section. In such an arrangement, light emitted by the light source and reflected from the cavity walls will impinge upon the ND:YAG rod. The light source is preferably selected to emit wavelengths corresponding to the absorption spectra of the ND:YAG crystal so that the neodymium ions of the crystal are inverted to an energy level above the upper lasing level. After inversion, an initial relaxation of the neodymium ions through phonon radiation yields an ion population at the upper lasing level. From this level, the ions will relax to a lower lasing level, emitting light of a wavelength which is characteristic of the ND:YAG material. Advantageously, the lower lasing level is above the ground level for the ions so that a rapid, phonon-emitting relaxation will occur between the lower lasing level and the ground level, enabling a high inversion ratio to exist between the upper and lower lasing levels within the pumped ions.

With the population so inverted, as is well known from laser technology, the ND:YAG will provide a very slow fluorescence, that is, random emission of incoherent light. This spontaneous radiation, however, has a minimal effect on the amplifying rod, since the average lifetime of ions in the inverted state is 230 microseconds, in ND:YAG.

If, after some of the neodymium ions of the ND:YAG rod have been inverted, a light signal at the lasing frequency is transmitted through the rod, the light signal will trigger the relaxation of the neodymium ions, causing coherent emission of stimulated radiation, which will effectively add to the transmitted signal, thus amplifying this signal.

The absorption length of the pumping illumination within the ND:YAG crystal (i.e., the length of material through which the illumination must traverse before about 65% of the illumination is absorbed) is typically in the range between 2 and 3 millimeters, and thus the ND:YAG crystals used in transverse pumping structures such as described previously have had diameters at least this large so that the crystal could absorb a substantial portion of the pumping radiation during the initial reflection from the cavity walls and passage through he crystal. If, during this initial traverse through the crystal, the pumping illumination is not absorbed, it is likely to be reflected by the cavity walls back to the light source, where it will be reabsorbed, generating heat in the light source and reducing the overall efficiency of the amplifier.

When such amplifiers are used in fiber optic systems, it has been thought necessary, because of the large difference in diameter between the optical fiber and the ND:YAG crystal, to use optical components, such as lenses, to focus light from the optical fiber into the ND:YAG rod, and the amplified light signal from the ND:YAG rod back into another fiber. Such optical systems require careful alignment and are susceptible to environmental changes, such as vibration, and thermal effects. Additionally, the optical components and the size of the ND:YAG rod make the amplifying system relatively large, and thus impractical for certain applications. Furthermore, the relatively large size of the ND:YAG rod introduces beam wander within the rod due to thermal effects. Thus, the signal from the input fiber optic element will traverse different paths through the rod, a characteristic which is temperature related and varies with time, so that the output light may be lost due to the fact that the fiber will accept only light within a small acceptance angle. Thus, as the beam within the ND:YAG rod wanders, the output signal may vary in an uncontrollable manner. Furthermore, the large size of the ND:YAG rod requires a large amount of input energy in order to maintain a high energy density within the rod. Such large pump power requires high output light sources, generating substantial heat which must be dissipated, typically by liquid cooling of the cavity.

While amplifiers of this type are useful in many applications, such as some communications applications, a use which puts severe limitations upon the amplification system is a recirculating fiber optic gyroscope. With such gyroscopes, an optical fiber, typically a kilometer or more in length, is wound into a loop, and a light signal is recirculated within the loop in both directions. Motion of the loop causes a phase difference between the counter-propagating light signals which may be used to measure gyroscope rotation. It is advantageous, because the phase shift induced in one rotation is relatively small and because periodic outputs relating to rotation are required, to recirculate input light within the loop as many times as possible.

In traversing a kilometer of optical fiber, an optical signal will typically lose 30 to 50 percent of its intensity. An amplifier, if capable of amplifying the bidirectional counter-propagating light signals, would permit a light signal to propagate many more times within the loop, if the amplifier were placed in a series with the loop, and provided a gain equal to the propagation loss.

Unfortunately, the relatively large size, high power requirements caused by relatively inefficient performance, beam wander effects, and cooling requirements of prior art ND:YAG rod amplifiers makes such amplifiers relatively impractical for high accuracy gyroscopes. These factors, of course, also limit the utility of such amplifiers in other applications, such as communication networks.

SUMMARY OF THE INVENTION

The disadvantages associated with crystal rod amplifiers are alleviated in the present invention. This invention permits end pumping of the ND:YAG material, and thus, completely avoids the requirement for a large diameter for this crystal which is inherent in side pumping arrangements. The ND:YAG fiber may thus be made extremely small in diameter in comparison with prior art rod amplifiers, since the pumping illumination is absorbed along the length of the fiber, rather than across its width. This results in a higher concentration of pumping illumination within the small diameter of the ND:YAG crystal and thus a higher potential gain for the amplifying structure.

In order to accomplish this end pumping, the ND:YAG material is formed as a small diameter fiber and is placed in series with the optical fiber which is transmitting the signal to be amplified.

Adjacent to the ND:YAG fiber, the optical fiber passes through a multiplexing optical coupler. Within this multiplexing coupler, a pair of optical fibers are arranged with a carefully selected interaction length to provide a high fiber-to-fiber coupling efficiency at the wavelength of the pumping source, but a low coupling efficiency at the wavelength of the signal to be amplified. This results in a coupling of the pumping illumination into the optical fiber which is carrying the signal, and thus into the ND:YAG fiber, while substantially eliminating loss to the optical signal which is to be amplified, since this signal is not coupled from the optical fiber of the multiplexing coupler.

Because the present invention permits the pumping illumination to be coupled into the optical signal fiber for guiding to the end of the ND:YAG fiber, the diameter of the ND:YAG fiber need not exceed the absorption length at the pumping wavelength, since the pumping illumination is effectively absorbed in a direction along the axis of the ND:YAG fiber rather than perpendicular to that axis.

Using this arrangement, pumping illumination can be continuously supplied to the amplifying ND:YAG fiber without interfering with its signal carrying characteristics. Thus, since a four-port coupler is used for multiplexing the pumping illumination to the amplifying fiber, the ends of the amplifying fiber are always available for direct signal coupling to the optical fibers within the optical system so that careful time sequencing between the application of pumping illumination and the signal to be amplified is not necessary.

In order to achieve uniform bidirectional amplification within the ND:YAG crystal, pumping illumination may be supplied by multiplexing couplers arranged at both ends of the ND:YAG fiber, providing a symmetrical inversion population along the length of this fiber.

BRIEF DESCRIPTION OF THE DRAWINGS

These and other advantages of the present invention are best understood through reference to the drawings, in which:

FIG. 1 is a cross sectional view of the fiber optic coupler used as a multiplexer in the present invention showing a pair of fiber optic strands mounted in respective arcuate grooves with a given radius of curvature of respective bases;

FIGS. 2 and 3 are cross sectional views of the coupler of FIG. 1 taken along lines 2—2 and 3—3, respectively;

FIG. 4 is a perspective view of the lower base of the coupler of FIG. 1 separated from the other base to show its associated fiber mounting and the oval-shaped facing surface of the fiber;

FIG. 9 is a schematic diagram showing the directional amplifier of the present invention;

FIG. 12 is a schematic diagram of a symmetrical bidirectional amplifier in accordance with the present invention;

FIG. 13 is a schematic diagram of an amplifier system, including a multiplexing coupler for signal insertion and signal sensing in a closed fiber loop.

DETAILED DESCRIPTION OF THE PREFERRED EMBODIMENT

Figure 5:
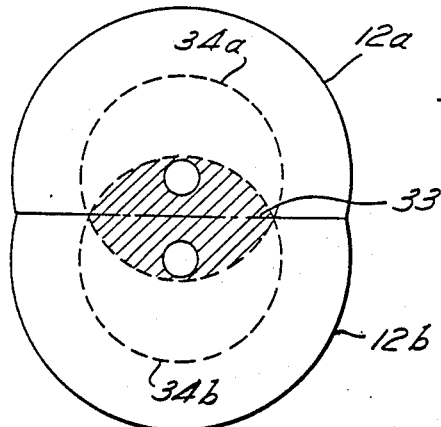
FIG. 5 is a schematic diagram showing the evanescent fields of the pair of fibers overlapping at the interaction region.

In order to gain a detailed understanding of the operation of the fiber optic amplifier of this invention, it is necessary to understand that manner in which a fiber optic coupler can be constructed to selectively couple a first optical frequency while not coupling a second optical frequency. The apparatus, as well as methods for constructing the apparatus, required for such selective coupling, are disclosed in copending patent application entitled "Passive Fiber Optic Multiplexer", filed in the U.S. Pat. Office Nov. 9, 1981, bearing Ser. No. 319,301, and listing Herbert J. Shaw and Michel J. F. Digonnet as inventors (now U.S. Pat. No. 4,556,279). The application is assigned to the assignee of the present invention. That application is hereby incorporated herein by reference. Nonetheless, the principal characteristics of that device and its method of manufacture are described below.

This invention utilizes a passive multiplexer which utilizes a fiber optic coupler. This coupler 10 is illustrated in FIGS. 1-4, and includes two strands 12A and 12B of a single mode fiber optic material. The fiber strands 12A and 12B, in the embodiment shown, have a core radius of 2 microns, a core refractive index of 1.46 and a cladding index of 1.456. The strands 12A and 12B are mounted in longitudinal arcuate grooves 13A and 13B, respectively, formed in optically flat confronting surfaces 14A and 14B, respectively, of rectangular bases or blocks 16A and 16B, respectively. The block 16A with the strand 12A mounted in the groove 13A will be referred to as the coupler half 10A and the block 16B with the strand 12B mounted in the groove 13B will be referred to as the coupler half 10B.

Each of the strands 12A and 12B comprise an optical fiber which is doped to have a central core and an outer cladding. The strands 12A and 12B may comprise a commercially available fiber of quartz glass which is doped to have a central core and an outer cladding. The index of refraction of the fibers 12A and 12B should be as nearly as possible identical, and both of the strands 12A and 12B should include a central core which is sufficiently small to provide single mode transmission at the optical frequencies to be used. Thus, these strands 12A and 12B typically have a core diameter on the order of 10 microns or less and a cladding diameter on the order of 125 microns. In the embodiment disclosed, the diameter of the strands 12 and their respective cores are exaggerated. As will be understood in more detail from the description which follows, the fiber 12B is used to transmit the signal to be amplified while the fiber 12A is used to couple pumping illumination to the fiber 12B. For this reason, the fiber 12B will be referred to as the signal fiber while the fiber 12A will be referred to as the pumping fiber.

The arcuate grooves 13A and 13B have a radius of curvature which is very large compared to the diameter of the fibers 12, and have a width slightly larger than the fiber diameter to permit the fibers 12, when mounted therein, to conform to a path defined by the bottom walls of the grooves 13. The depth of the grooves 13A and 13B varies from a minimum at the center of the blocks 16A and 16B, respectively, to a maximum at the edges of the blocks 16A and 16B, respectively. This advantageously permits the fiber optic strands 12A and 12B, when mounted in the grooves 13A and 13B, respectively, to gradually converge toward the center and diverge toward the edges of the blocks 16A, 16B, thereby eliminating any sharp bends or abrupt changes in direction of the fibers 12 which may cause power loss through mode perturbation. In the embodiment shown, the grooves 13 are illustrated as being rectangular in cross section, however, it will be understood that other suitable cross sectional contours which will accommodate the fiber 12 may be used alternatively, such as a U-shaped cross section or a V-shaped cross section.

At the centers of the blocks 16, in the embodiment shown, the depth of the grooves 13, which mount the strands 12, is less than the diameter of the strands 12, while at the edges of the blocks 16, the depth of the grooves 13 is preferably at least as great as the diameter of the strands 12. Fiber optic material was removed from each of the strands 12A and 12B e.g. by polishing, to form the respective oval-shaped planar surfaces 18A, 18B, which are coplanar with the confronting surfaces 14A, 14B, respectively. These surfaces 18A, 18B, will be referred to herein as the fiber "facing surfaces". Thus, the amount of fiber optic material removed increases gradually from zero towards the edges of the block 16 to a maximum towards the center of the block 16. This tapered removal of the fiber optic material enables the fiber cores to converge and diverge gradually, which is advantageous for avoiding backward reflection and excess loss of light energy.

In the embodiment shown, the coupler halves 10A and 10B are identical, and are assembled by placing the confronting surfaces 14A and 14B of the blocks 16A and 16B together, so that the facing surfaces 18A and 18B of the strands 12A and 12B are in facing relationship.

An index matching substance (not shown), such as index matching oil, is provided between the confronting surfaces 14. This substance has a refractive index approximately equal to the refractive index of the cladding, and also functions to prevent the optically flat surfaces 14 from becoming permanently locked together. The oil is introduced between the blocks 16 by capillary action.

An interaction region 32 is formed at the junction of the strands 12, in which light is transferred between the strands by evanescent field coupling. It has been found that, to insure proper evanescent field coupling, the amount of material removed from the fibers 12 must be carefully controlled so that the spacing between the core portions of the strands 12 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 12 is within the critical zone, each strand receives a significant portion of the evanescent field energy from the other strand, and good coupling is achieved without significant energy loss. The critical zone is illustrated schematically in FIG. 5 are including that area, designated by the reference numeral 33, in which the evanescent fields, designated by reference numerals 34A and 34B, of the fibers 12A and 12B, respectively, overlap with sufficient strength to provide coupling, i.e., each core is within the evanescent field of the other.

The blocks or bases 12 may be fabricated of any suitable rigid material. In one presently preferred embodiment, the bases 12 comprise generally rectangular blocks of fused quartz glass approximately one inch long, one inch wide, and 0.4 inch thick. In this embodiment, the fiber optic strands 12 are secured in the slots 13 by suitable cement 38, such as epoxy glue. One advantage of the fused quartz blocks 16 is that they have coefficient of thermal expansion similar to that of glass fibers, and this advantage is particularly important if the blocks 16 and fibers 12 are subjected to any heat treatment during the manufacturing process. Another advantage of the fused quartz blocks is that, as they are made of the same material as the optical fiber, they polish at the same rate as the optical fiber, and thus, provide a continuous support to the fiber during polishing. Other suitable materials for the block 16 include silicon, which also has excellent thermal properties for this application.

OPERATION OF THE COUPLER 10

The coupler 12 includes four ports, labeled A, B, C, and D in FIG. 1. When viewed from the perspective of FIG. 1, ports A and C, which correspond to strands 12A and 12B, respectively, are on the left-hand side of the coupler 10, while the ports B and D, which correspond to the strands 12A and 12B, respectively, are on the right-hand side of the coupler 10. For the purposes of discussion, it will be assumed that input light is applied to port A. This light passes through the coupler and is output at port B and/or port D, depending upon the amount of power that is coupled between the strands 12. In this regard, the term "normalized coupled power" is defined as the ratio of the coupled power to the total output power. In the above example, the normalized coupled power would be equal to the ratio of the power at port D to the sum of the power output at ports B and D. This ratio is also referred to as the "coupling efficiency", and when so used is typically expressed as a percent. Thus, when the term "normalized coupled power" is used herein, it should be understood that the corresponding coupling efficiency is equal to the normalized coupled power times 100. In this regard, tests have shown that the coupler 10 has a coupling efficiency of up to 100%. However, it will also be seen that the coupler 10 may be "tuned" to adjust the coupling efficiency to any desired value between zero and the maximum. Such tuning may be accomplished e.g. by relatively laterally sliding the fibers in a direction perpendicular to their length. The relative positions of the fibers may be defined in terms of their offset, i.e. the distance between the central axes of the fiber cores, measured in the direction perpendicular to their length, along the surfaces 14. Thus, when the oval surfaces 18 are superimposed, the offset is zero, and the offset increases as the fibers 12 are laterally separated by relatively sliding the blocks 16.

The coupler 10 is highly directional, with substantially all of the power applied at one side of the coupler being delivered to the other side of the coupler. The coupler directivity is defined as the ratio of the power at port D to the power at port C, with the input applied to port A. Tests have shown that the directionally coupled power (at power D) is greater than 60 db above the contra-directionally coupled power (at port C). Further, the coupler directivity is symmetrical. That is, the coupler operates with the same characteristics regardless of which side of the coupler is the input side and which side is the output side. Moreover, the coupler 10 achieves these results with very low throughput losses. The throughput loss is defined as the ratio of the total output power (ports B and D) to the input power (port A) subtracted from one (i.e., $1-(P_B+P_D)/P_A$). Experimental results show that throughput losses of 0.2 db have been obtained, although losses of 0.5 db are more common. Moreover, these tests indicate that the coupler 10 operates substantially independently of the polarization of the input light applied.

The coupler 10 operates on evanescent field coupling principles in which guided modes of the strands 12 interact, through their evanescent fields, to cause light to be transferred between the strands 12. As previously indicated, this transfer of light occurs at the interaction region 32. The amount of light transferred is dependent upon the proximity and orientation of the cores, as well as the effective length of the interaction region 32. As will be described in detail below, the amount of light transferred is also dependent of the wavelength of the light. The length of the interaction region 32 is, in turn, dependent upon the radius of curvature of the fibers 12, and, to a limited extent, the core spacing, although it has been found that the effective length of the interaction region 32 is substantially independent of core spacing. However, the "coupling length", i.e., the length within the interaction region 32 which is required for a single, complete transfer of a light signal from one fiber 12 to the other, is a function of core spacing, as well as wavelength. In one exemplary embodiment, employing an edge-to-edge core spacing of about 1.4 microns, and a radius of curvature on the order of 25 centimeters, the effective interaction region is approximately one millimeter long at a light signal wavelength of 633 nm. Because the coupling length at 633 nm is also one millimeter in such a coupler, the light makes only one transfer between the strands 12 as it travels through the interaction region 32. However, if the length of the interaction region 32 is increased, or core spacing decreased, a phenomenon referred to herein as "overcoupling" will occur, since the coupling length is shorter than the effective interaction length. Under these circumstances, the light will transfer back to the strand from which is originated. As the interaction length is further increased, and/or the core spacing further decreased, the effective interaction length increases relative to the coupling length, and at least some of the light transfers back to the other strand. Thus, the light may make multiple transfers back and forth between the two strands 12 as it travels through the region 32, the number of such transfers being dependent on the length of the interaction region 32, the light wavelength (as described below), and the core spacing.

Since the coupling length in a single mode fiber coupler, as described above, shows a strong dependence on signal wavelength, as described in detail in the copending application incorporated above, it is possible with properly chosen geometrical parameters for the coupler 10, to totally couple one signal wavelength while a second signal wavelength remains essentially uncoupled. This phenomenon permits the combination of two signals fed into the ports on one side of the coupler 10. Thus, as shown in FIG. 1, if a pumping signal having a wavelength $\lambda_1$ is fed into port A of coupler 10, and a signal to be amplified, having a wavelength $\lambda_2$ is coupled to port C, and the geometry is properly selected, both signals can be combined at port D, with virtually no light output at port B.

Figure 6:
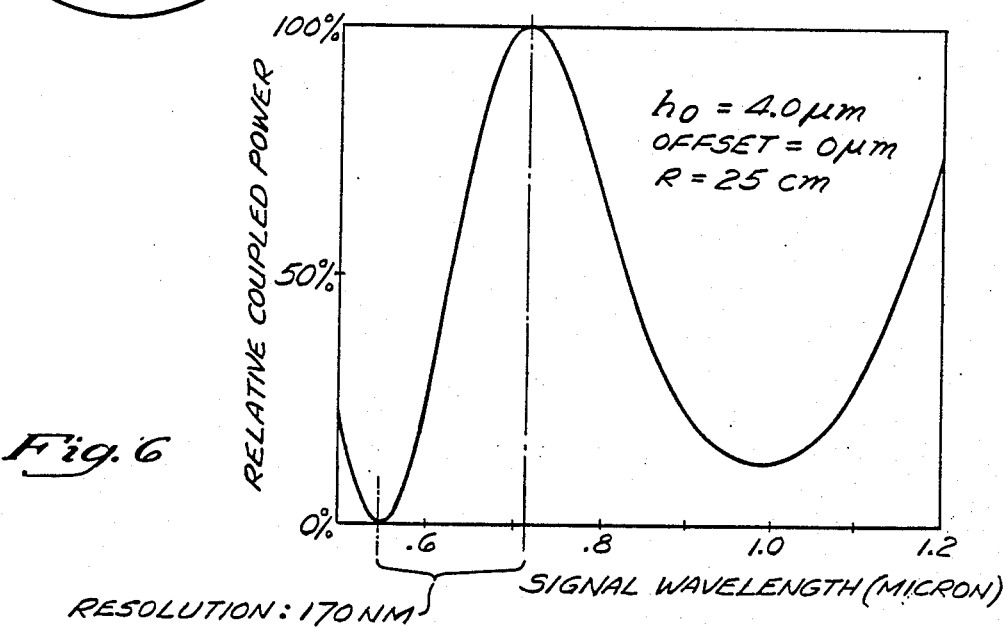
FIG. 6 is a chart showing relative coupled power versus signal wavelength for a fiber coupler having a minimum fiber spacing of 4 microns, an offset of 0 micron, and a fiber radius of curvature of 25 centimeters.

To illustrate this wavelength dependence, FIG. 6 provides a plot of coupled power versus signal wavelength in the visible and near infrared spectrum for a particular coupler geometry. Because for this coupler configuration the effective interaction length of the coupler is an odd multiple of the coupling length for the wavelength 720 nm, but an even multiple of the coupling length for the wavelength 550 nm, the wavelength 720 nm will be 100% coupled, while the wavelength 550 nm will be effectively uncoupled. With different efficiencies, different wavelengths may be combined or separated. For instance, 590 nm and 650 nm may be separated or combined at an 80% efficiency.

Virtually any pair of wavelengths ($\lambda_1$, $\lambda_2$) may be efficiently combined or separated so long as the effective interaction length is an even multiple of the coupling length for one wavelength and an odd multiple for coupling length for the other wavelength. As the number of coupling lengths within the effective interaction length increases, the resolution of the multiplexer is enhanced. As is described in detail in the incorporated reference, the multiplexer resolution may be enhanced by increasing the radius of curvature of the fibers 12A,12B. Provided that the interaction length of the coupler is large enough, virtually any two signals may be exactly mixed or separated, regardless of how closely spaced their wavelengths are.

Figure 7:
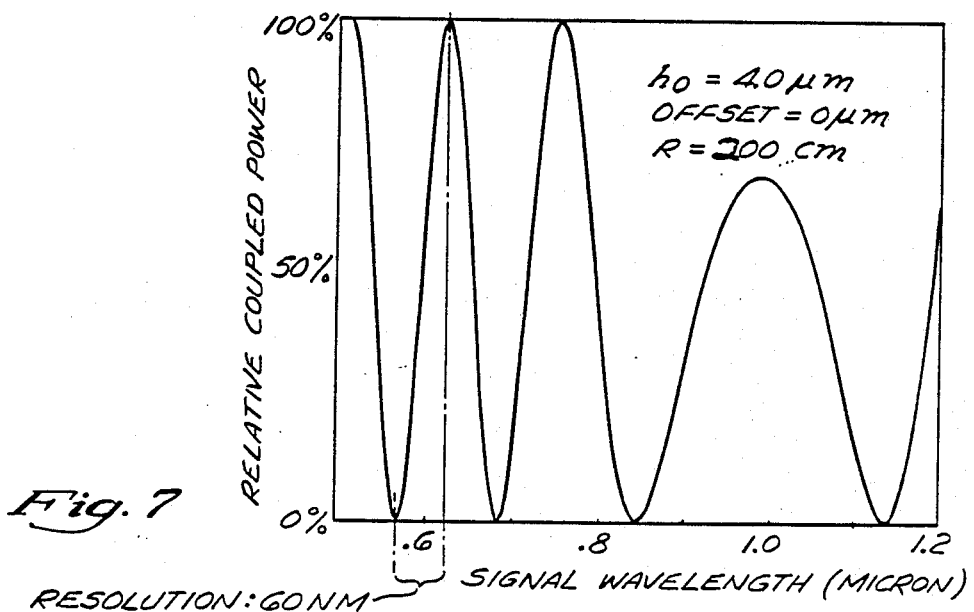
FIG. 7 is a chart of relative coupled power versus signal wavelengths similar to FIG. 6 but with a fiber radius of curvature of 200 centimeters.

The interaction length is a function of wavelength, and the resolution is approximately proportional to $(R)^{\frac{1}{2}}$. As R increases, the effective interaction length increases, and becomes a higher multiple of the coupling length, improving resolution. This result is illustrated in FIG. 7, which is comparable to the graph of FIG. 6, except that the radius of curvature has been increased to 200 centimeters. As anticipated, this increase in radius improves the coupler resolution near g=600 nm from approximately 170 nm in the 25 centimeter radius example of FIG. 6 to approximately 60 nm in the 200 centimeter case.

The resolution of a multiplexing coupler depends on two independent parameters, H (fiber spacing) and R (radius of curvature of the fibers). For a given pair of signal wavelengths, efficient mixing may be achieved by first properly selecting a fiber spacing H for the coupler which yields a large wavelength dependence for the wavelengths of interest (choice of H), and then by selecting a radius of curvature which yields a resolution equal to the difference between the wavelengths (choice of R).

After the resolution of the coupler has been set in accordance with the wavelengths to be separated, the coupler may be tuned to precisely adjust the coupling lengths for the wavelengths of interest so that the effective interaction length is an even multiple of the coupling length of one wavelength and an odd multiple of the coupling length of the other wavelength. This is accomplished by offsetting the fibers by sliding the blocks 16A,16B (FIG. 1) relative one another in a direction normal to the axis of the fibers 12A,12B. Such an offset has the effect of increasing the minimum fiber spacing H and increasing the effective radius of curvature of the fibers. If the required offset is small enough, it will not upset the multiplexer resolution. This stems from the fact that the separation H of a large radius coupler changes rapidly with fiber offset in comparison to changes in the effective radius of curvature with fiber offset.

Figure 8:
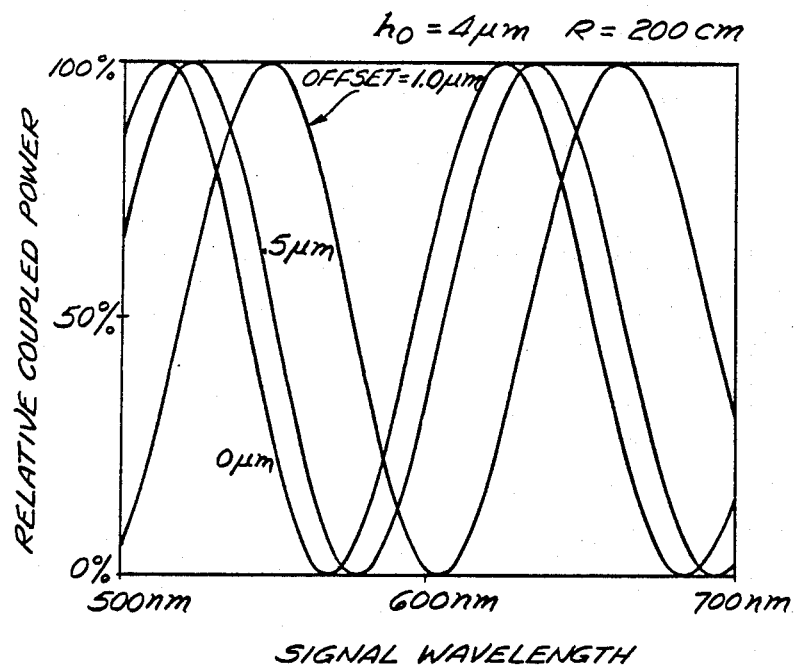
FIG. 8 is a chart of relative coupled power versus signal wavelength for a fiber coupler having a minimum fiber spacing of 4 microns, a fiber radius of 200 centimeters, and a selectable fiber offset.

To illustrate this tunability of multiplexing couplers, FIG. 8 provides a plot of relative coupled power versus wavelength for three increasing values of fiber offset (0 microns, 0.5 microns, and 1.0 microns). The curve is seen to shift toward increasing wavelengths as the offset increases, while the period of oscillation (or resolution) remains virtually unchanged. In this particular example (R=200 cm, H=4 microns), a 1-micron offset shifts the curve by approximately 45 nm.

OVERALL OPERATION OF THE AMPLIFIER

Referring now to FIG. 9, the manner in which the amplifier of the present invention utilizes the wavelength multiplexing properties of the coupler 10 to provide pumping illumination to energize ND:YAG fiber will be described.

A source of pumping illumination 42 is coupled to the fiber 12A of the coupler 10 to provide pumping illumination at port A of the multiplexing coupler 10, and a signal to be amplified is coupled to one end of the fiber 12B at port C of the coupler 10. The pumping illumination from the source 42 and the signal to be amplified are combined at port D at the coupler 10 through the multiplexing action of the coupler, as explained above. Thus, the coupler 10 is adjusted to have a 100% coupling efficiency at the wavelength of the source 42, and a 0% coupling efficiency, at the wavelength of the signal input at port C. This pair of signal wavelengths is supplied to an ND:YAG crystal 44 which is coupled to the fiber 12B in the manner described below. The signal input at the port C will be amplified in the ND:YAG crystal 44 and the amplified signal will be coupled from this crystal 44 to an optical fiber 46 for transmission within the optical fiber system. The diameter of the ND:YAG crystal 44 may be extremely small in comparison with the diameter of ND:YAG rods used in prior art amplifiers. For example, an amplifier has been constructed in which the crystal 44 has a diameter of 100 microns. Even smaller diameters are feasible, approaching the diameter of the single mode fiber 12B. Coupling between the fiber 12B and the crystal 44 is enhanced as the diameter of the crystal 44 is reduced and signal gain is increased since the density of pumping illumination from the source 42 within the crystal 44 increases as the crystal 44 diameter is reduced.

ND:YAG AMPLIFICATION

Figure 10:
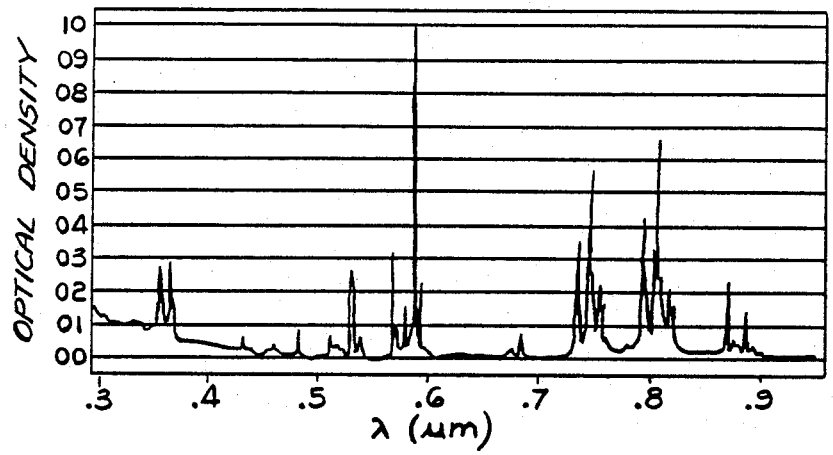
FIG. 10 is a diagram showing the absorption spectrum of ND:YAG at 300° K.

Referring now to FIG. 10, which is a diagram of the absorption spectrum of the ND:YAG crystal 44 at 300° K., it can be seen that ND:YAG material has a relatively high optical density, and thus a short absorption length, at selected wavelengths. For this reason, it is advisable to select the wavelength of the pumping illumination source 42 in order to permit the absorption length to be as short as possible. This will permit substantially complete absorption of the pumping illumination within a very short length of the ND:YAG crystal 44. As can be seen from FIG. 10, the wavelength 0.58 microns is best suited for pumping illumination, although the wavelengths 0.75 and 0.81 microns are relatively well suited.

Figure 11A:
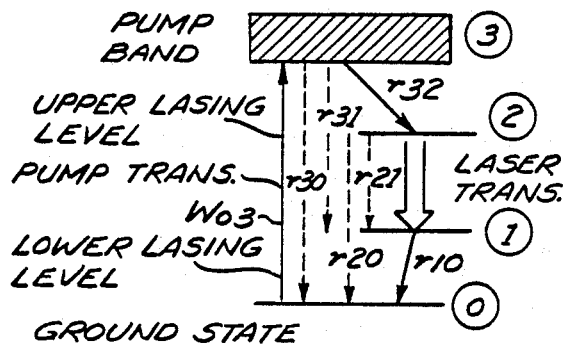
FIG. 11a and 11b are simplified energy level diagrams of a four-level laser using a doped material, such as ND:YAG.
Figure 11B:
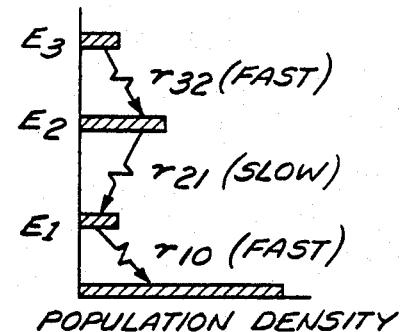

Referring now to FIG. 11A, which is an energy level diagram for the ND:YAG crystal 44, it will be understood that, when pump light at the absorption wavelength, described above, is absorbed by the ND:YAG crystal 44, the neodymium ions are excited from the ground state to the pump band. From the pump band, the ions quickly relax, through phonon interactions, to the upper lasing level. From this upper lasing level, the neodymium ions will undergo a relatively slow fluorescence to the lower lasing level. From this latter level, a final, rapid phonon relaxation occurs to the ground state. This latter rapid relaxation in a four-level laser system of the type shown in FIG. 11A is advantageous, since the rapid phonon relaxation between the lower lasing level and the ground state provides a practically empty lower lasing level. This feature is shown in FIG. 11B, in which the population densities at the pump band upper lasing level, lower lasing level, and ground state are shown for the ND:YAG crystal 44 during continuous pumping. Because the rage of fluorescence between the upper lasing level and lower lasing level is relatively slow in comparison with the phonon relaxation between the pump band and the upper lasing level, as well as between the lower lasing level and the ground state, the population density at the upper lasing level is substantially higher than that at the lower lasing level, yielding a high inversion ratio. The average lifetime of neodymium ions at the upper lasing level, prior to spontaneous fluorescence, is about 230 microseconds at 300° k. in ND:YAG.

The signal to be amplified is selected to have a wavelength at the laser transition wavelength (1.064 microns), i.e., the wavelength of light emitted by the ND:YAG ions during relaxation between the upper and lower lasing levels. When this signal is supplied to the crystal 44 by the coupler 10 (FIG. 9), it will trigger the emission of stimulated photons at the same frequency, coherent with the signal, and the signal is thereby amplified. Thus, the passage of light at this frequency will cause a photon emitting relaxation between the upper lasing level and lower lasing level of FIG. 11A, in phase with the light signal to be amplified, yielding an effective gain for the input light signal.

The gain which can be achieved in the amplifier of this invention is dependent upon the density of the inverted neodymium ion population within the ND:YAG crystal 44. Initially, the ultimate inversion population is limited by the lattice structure of the YAG material 44 itself since the ND:YAG material, some yttrium atoms are replaced with neodymium atoms in the crystal lattice. Only approximately 1 yttrium atom in each 100 yttrium atoms may be replaced by a neodymium ion without distorting the lattice structure on the ND:YAG material.

Theoretical calculations of the small gain signal ($g_0$ of the amplifier of this invention can be made, using the relation $g_0 \propto \Delta N$, where $\sigma$ is the stimulated emission cross section, for ND:YAG, $8.8 \times 10^{-19} cm^2$, and $\Delta N$ is the population inversion density given by:

$$\Delta N = \frac{P_p}{V} \frac{\eta_1 \eta_2 t_{sp}}{h\nu} \qquad (1)$$

where $P_p$ is the absorbed pump power, V is the crystal volume and thus, $P_p/V$ is the absorbed pump power per unit of fiber volume, $t_{sp}$ is the spontaneous radiative lifetime, that is, the 230-microsecond fluorescence relaxation time of the neodymium ions, $\eta_1$ is the effective spectral overlap of pump output with an ND:YAG absorption line, as shown in FIG. 10, $\eta_2$ is equal to the quantum efficiency of 1.06-micron fluorescence, namely 0.63, and $h\gamma$ is equal to the energy of one pump photon.

Combining the above relationship provides:

$$g_0 = \sigma \frac{P_p}{V} \frac{\eta_1 \eta_2 t_{sp}}{h\nu} \qquad (2)$$

for the dependence of gain on pump power. It should be recognized that the value $P_p$ is the absorbed pump power and that an increase in the length of the crystal 44 does not necessarily increase the gain. Thus, if the pumping radiation from the source 42 is coupled completely to the ND:YAG crystal 44, and travels in the crystal 44 a distance which is sufficient to permit this crystal 44 to nearly completely absorb the pumping radiation, then the value $P_p$ in this equation may be replaced by the input power level. To obtain the net gain, however, one must subtract from $9_0$ the propagation losses within the ND:YAG crystal 44 at 1.06 microns. A loss of 100 db per kilometer would reduce the gain by only 0.001 dB per centimeter. Thus, if the overall length of the crystal 44 can be maintained relatively short, while still absorbing substantially all of the input pump power, the propagation losses within the amplifier can be maintained at a low level.

DETAILED OPERATION OF THE AMPLIFIER

Referring again to FIG. 30, the pumping source 42 coupled to the fiber 12A at the port A of the coupler 10, through the multiplexing action of the coupler 10, provides pumping illumination for the ND:YAG crystal 44. The pumping source 42 may be, for example, a long-life LED, such as those currently available which operate at a current density of approximately 1,000 amps per $cm^2$ and have a radiance of approximately 5 watts per sr.$cm^2$. In fact, some LEDs have been reported with a radiance of approximately 50 watts/sr./$cm^2$. Because of the size differential between the single mode fiber 12A and these LEDs, a lens may be useful in focusing the output of the LED source into the fiber 12A.

Alternatively, the pump source 42 may be laser diode which permits even higher concentrations of pump power in the fiber 12A and thus in the ND:YAG crystal 44.

Regardless of the type of pumping source 42 utilized, the efficiency of the system will be enhanced if the wavelength of the radiation from this source 42 corresponds to a peak in the absorption spectrum of the ND:YAG crystal 44, shown in FIG. 10. Electroluminescent diodes are commercially available with appropriate dopings to emit spectra in the 0.8 micron range which match quite well the absorption spectrum of room temperature ND:YAG material. For example, commercially available GaAlAs LEDs provide radiation spectra which are strong at the 0.8 micron region. Similarly, laser diode structures are commercially available which emit energy over the 0.8 to 0.85 micron range. In addition, the pump wavelength should be as close to the signal wavelength as allowed by the spectroscopy of the ND:YAG, to maximize the overall pumping efficiency.

It will be recalled that the lasing frequency of the ND:YAG material of the crystal 44 is 1.06 micron. The multiplexing coupler 10 is thus fabricated for use in this invention to provide virtually complete coupling at the wavelength of the pumping source 42, 0.8 microns in the above example, while providing substantially no coupling at the lasing frequency of the ND:YAG crystal 44, 1.06 microns in this same example.

This selective coupling is accomplished, in accordance with the techniques described above, by properly selecting the fiber spacing H to yield a large wavelength dependence for wavelengths between 0.8 microns and 1.06 microns, and then by selecting a radius of curvature for the fibers 12A,12B which yields a resolution equal to the difference between 1.06 and 0.8 microns, or 0.26 microns. After the resolution of the coupler has been set in this manner, the coupler may be tuned, as previously described, to adjust the coupling length for the wavelengths 0.8 microns and 1.06 microns so that the effective interaction length is an even multiple of the coupling length for one of this pair of wavelengths and an odd multiple of the coupling length for the remaining wavelength. In the example shown in FIG. 9, since it is desired to couple the output of the pump source 42 into the fiber 12B, the effective interaction length for the coupler should be adjusted to be an odd multiple of the coupling length at the wavelength of the pump source 42, i.e., 0.8 microns, and to be an even multiple of the signal frequency 1.06 microns. This will result in a complete coupling of the illumination from the pump source 42, from the fiber 12A into the fiber 12B, with essentially no coupling of the signal to be amplified from the fiber 12B to the fiber 12A. It will be understood, of course, that no coupling in this instance means an even number of complete couplings so that, for example, if the effective interaction length at the region 32 is twice the coupling length at 1.06 microns, the signal to be amplified will be coupled two complete times, once from the fiber 12B to the fiber 12A, and then from the fiber 12A to the fiber 12B. If this signal enters the coupler at port C, as shown on the left of FIG. 9, it will exit uncoupled at port D. However, at port D, the signal to be amplified will coexist with light from the pumping source 42, which will be completely coupled from the fiber 12A to the fiber 12B.

Since light from the pumping source 42 will be transmitted along the fiber 12B, after coupling, this pumping illumination will invert the neodymium ions in the ND:YAG crystal 44. Thus, a signal, which is injected at port C and exits, uncoupled, from port D, will be amplified in the manner previously described as it passes through the crystal 44, since this signal will excite spontaneous lasing relaxation of the ND:YAG material of the crystal 44, which lasing relaxation will provide light coherent with the signal to be amplified.

The amplifier of the present invention therefore provides a convenient means to transfer pumping illumination from the pump source 42 by wavelength dependent coupling to the ND:YAG crystal 44, while prohibiting coupling of the signal to be amplified from the fiber 12B to the fiber 12A. It should be recognized that the results achieved in the present invention may also be realized using a coupler in which the coupling efficiency at the pumping illumination wavelength is 0%, while the coupling efficiency at the light signal wavelength is 100%. In this case, the pumping source would be coupled to port C of the coupler 10, while the input light signal to be amplified would be coupled to port A.

BIDIRECTIONAL SYMMETRY

In order to make the amplifier symmetrically bidirectional, a pair of pump sources 42,48 should be utilized, as shown in FIG. 12, along with a pair of multiplexing couplers 50,52. It will be understood that, if such bidirectional symmetry is not necessary, either of the pump sources 42,48 will invert ions at one end of the ND:YAG crystal 44 and will thus yield gain for signals transmitted in either direction in the crystal 44.

If only one of the pump sources 42,48 is utilized, it should be recognized that the ND:YAG crystal 44 will not be uniformly illuminated. Thus, the inverted population of neodymium ions will not be uniformly distributed along the length of the crystal 44. Because this non-uniform or non-symmetrical state within the amplifier may yield different gain for signals input at the fiber 54, than for signals input at the fiber 56 (particularly when these signals occur simultaneously), it is advantageous to utilize the pair of sources 42,48.

The phenomenon of dissimilar gain for signals traversing the fiber crystal 44 in different directions with a non-symmetrical inversion population of neodymium ions occurs as follows. It will recognized that, as a signal to be amplified propagates from left to right in the crystal 44 of FIG. 12, it will trigger the emission of stimulated photons within the ND:YAG crystal 44. Such triggering emission, of course, lowers the inversion population within the crystal 44. If, for example, in a gyroscope, a pair of waves propagate simultaneously through the crystal 44 in opposite directions, the signal input at the left end will deplete the inversion population adjacent this end before the signal input at the right end arrives at the left end of the crystal 44, as viewed in FIG. 12. If the inversion population is higher at the left end of the crystal 44, than at the right end, as would be the case if only the pump source 42 were utilized, the signal input at the left will undergo a greater amplification, since it will deplete the inversion population before the signal which is input at the right end arrives at the high density left end.

It should be recognized that the pumping illumination supplied by the pump sources 42,48 should be sufficient, on a continuing basis, to replace the depleted population within the crystal 44 which occurs when the signals are amplified. Thus, for example, in a gyroscope where a pulse signal circulates through a kilometer of fiber, a counter-propagating signal will traverse the amplifier, shown in FIG. 12, approximately once each 5 microseconds. If continuous pump sources 42,48 are used, they should provide sufficient output so that, during each 5-microsecond period, they are capable of reinverting the neodymium ion population which is relaxed during each successive traverse of the signals to reinvert a population equal to that which has relaxed, such that the amplification factor or gain of the amplifier will remain relatively constant.

As will be recognized from the above-description, a proper selection of fiber spacing and radius of curvature will yield a coupler which permits pumping sources 42,48 to illuminate the crystal 44 to invert the neodymium population therein. With a proper selection of the coupler parameters, the signal to be amplified is not coupled from the fibers 54,56, and thus traverses the crystal 44 to be amplified by stimulating relaxation of neodymium ions in the crystal 44 which produces light coherent with the signal to be amplified.

SIGNAL INSERTION

Referring now to FIG. 13, a system arrangement is shown in which the multiplexing properties of a pair of couplers 58,60 is used to permit a pumping source 42 to illuminate the ND:YAG crystal 44 while also permitting an injection of signals into a recirculating fiber optic system. In this instance, for example, it may be assumed that the fiber ends 62,64 are a part of a recirculating fiber loop and that the system, in addition to supplying pumping illumination for the crystal 44, to amplify signals circulating in this loop, must supply signals for injection into the loop.

In the system shown in FIG. 13, the coupler 58 is arranged to couple light wavelengths from the illumination source 42 with a coupling efficiency of 100%, while leaving the input signal at an input fiber 66 effectively uncoupled. This will yield a combination signal on the fiber segment 68 which includes both the pumping illumination from the source 42 and the input signal from the fiber 66. If the characteristics of the coupler 60 are properly selected in the manner described above, and this coupler 60 is properly tuned, the coupler 60 may be arranged to couple 100% of light wavelengths from the pumping signal 42 but only 1% of wavelengths at the signal input from the fiber segment 68. Thus, 1% of the input signal from the fiber segment 66 will be injected into the fiber recirculating loop and will initially be transmitted through the crystal 44 to the fiber segment 64 for recirculation. At the same time, 100% of the pumping illumination from the source 42 will be injected into the end of the crystal 44 to provide amplification for the recirculating signal.

When this recirculating signal appears at the fiber segment 62, only 1% of the signal will be lost at the coupler 60 and this 1% may supply an output for a sensor 70 to monitor the recirculating light. The remaining 99% of the recirculating light signal will be injected into the crystal 44 from the coupler 60, for reamplification and recirculation within the fiber loop. This system, therefore, with the use of two couplers 58,60, provides continuous sensing of the light circulating in the fiber loop, signal injection into the loop, and continuous pumping for the amplifying crystal 44. The coupling efficiencies provided above are exemplary only, but it should be recognized that the coupling efficiency of the coupler 60 should be maintained relatively low at the wavelength of the signal propagating in the loop so that only a small portion, smaller than the amplification added to the signal at the crystal 44, is subtracted from the recirculating signal by the coupler 60.

SUMMARY

The combination of the multiplexing coupler with an ND:YAG amplifying crystal permits end pumping of the amplifying crystal with simultaneous signal injection at the end of this fiber so that the pumping illumination need not be carefully timed with respect to the signal to be amplified. Symmetrical bidirectional amplification is possible and signal injection using the same multiplexing coupler may be achieved.

What is claimed is:

1. A fiber optic amplifier, comprising:
   an optical fiber comprised of a material which will emit light in response to pumping;
   a source of signals comprising light at a frequency of said emitted light;
   a source of light for pumping said material; and
   means for coupling both said signals and said light for pumping into an end of said optical fiber.

2. A fiber optic amplifier as defined in claim 1 in which said means for coupling comprises an optical coupler.

3. A fiber optic amplifier as defined in claim 2, wherein said optical coupler comprises a single-mode optical coupler.

4. A fiber optic amplifier as defined in claim 2 in which said optical coupler utilizes evanescent field coupling.

5. A fiber optic amplifier as defined in claim 3 in which said optical coupler provides different coupling coefficients for said signals and said light for pumping.

6. A fiber optic amplifier as defined in claim 5 in which said optical coupler has a coupling efficiency which is wavelength dependent and in which said signals and said light for pumping are at different wavelengths, yielding different coupling efficiencies for said signals and said light for pumping.

7. A fiber optic amplifier, comprising:
   a fiber optic coupler including a pair of optical fibers juxtaposed to provide coupling of light at a first frequency between said fibers and to prohibit coupling of light at a second frequency between said fibers;
   a source of pumping illumination coupled to a first end of one of said pair of fibers, said pumping illumination comprising light having said first frequency;
   a source of a signal to be amplified, coupled to a first end of the other of said pair of fibers, said signal to be amplified comprising light having said second frequency; and
   a laser fiber formed of material which will possess a laser transition at said second frequency of said signal to be amplified if said material is pumped with said pumping illumination, said laser fiber coupled at one end to a second end of said other of said pair of fibers.

8. A fiber optic amplifier as defined in claim 7 in which said fiber optical coupler has an effective interaction length at the juxtaposition of said optical fibers which is an even multiple of the coupling length of said fibers at said juxtaposition at a first wavelength corresponding to one of said first and second frequencies and an odd multiple of the coupling length of said fibers at said juxtaposition at a second wavelength corresponding to the other of said first and second frequencies.

9. A fiber optical amplifier as defined in claim 8, wherein said pair of optical fibers are laterally offset from one another to tune said coupler to provide said odd and even multiples.

10. A fiber optic amplifier as defined in claim 9, wherein said pair of optical fibers are arcuate and wherein the radius of said arcuate optical fibers is selected in accordance with the difference between said first and second wavelengths.

11. A fiber optic apparatus, comprising:
    a source of pump light comprising light having a first wavelength;
    an optical fiber comprising a laser material, said optical fiber emitting light at a second wavelength in response to pumping at said first wavelength; and
    an optical coupler having an input port and an output port, said input port coupled to said pump source to receive light from said pump source, said output port coupled to said optical fiber for pumping said laser material, said coupler being highly wavelength discriminating so as to selectively couple one of said first and second wavelengths without substantial coupling of the other of said first and second wavelengths.

12. A method for amplifying a light signal carried by an optical fiber, comprising the steps of:
    combining said light signal and pumping illumination on a single optical fiber; and
    coupling said combined light signal and pumping illumination from said single optical fiber to one end of a fiber comprised of a material which will emit stimulated radiation at a wavelength of said light signal if pumped with said pumping illumination.

13. A method of amplifying a light signal as defined in claim 12, wherein said combining step comprises multiplexing said wavelength of said light signal and a wavelength of said pumping illumination in an optical coupler which is optically connected to said single optical fiber and which has a coupling efficiency which is wavelength dependent.

14. A method of amplifying a light signal as defined in claim 13, wherein said multiplexing step comprises:
    juxtaposing a pair of optical fibers to provide an interaction length; and
    applying said light signal to one of said fibers and said pumping illumination to the other of said fibers.

15. A method of amplifying a light signal as defined in claim 12, wherein the step of coupling comprises coupling said combined light signal and pumping illumination to a laser fiber having a diameter which is less than the absorption length of said laser fiber at said wavelength of said pumping illumination.

* * * * *

US004859016B1

REEXAMINATION CERTIFICATE (4193rd)

United States Patent [19]
Shaw et al.

[11] B1 4,859,016
[45] Certificate Issued   *Nov. 7, 2000

[54] FIBER OPTIC AMPLIFIER

[75] Inventors: Herbert J. Shaw, Stanford; Michel J. F. Digonnet, Palo Alto, both of Calif.

[73] Assignee: The Board of Trustees of The Leland Stanford Junior University

Reexamination Request:
No. 90/005,445, Aug. 9, 1999

Reexamination Certificate for:
Patent No.: 4,859,016
Issued: Aug. 22, 1989
Appl. No.: 07/137,870
Filed: Dec. 22, 1987

[ * ] Notice: This patent is subject to a terminal disclaimer.

Related U.S. Application Data

[62] Division of application No. 06/930,136, Nov. 12, 1986, Pat. No. 4,723,824, which is a division of application No. 06/554,888, Nov. 25, 1983, Pat. No. 4,674,830.

[51] Int. Cl.$^7$ .............................. G02B 6/26; H01S 3/067
[52] U.S. Cl. .............................. 385/5; 359/341; 359/342; 372/6; 372/69
[58] Field of Search .............................. 385/4, 5, 15, 27, 385/28, 30, 31, 38, 39, 122, 126, 127; 372/3, 6, 69, 70, 71, 94; 359/333, 341, 342, 343, 345

[56] References Cited

U.S. PATENT DOCUMENTS

| | | | |
|---|---|---|---|
| 3,705,992 | 12/1972 | Ippen et al. | 359/327 |
| 3,826,992 | 7/1974 | Freidl | 359/341 |
| 4,136,929 | 1/1979 | Suzaki | 385/30 |
| 4,243,297 | 1/1981 | Elion | 359/127 |

FOREIGN PATENT DOCUMENTS

| | | |
|---|---|---|
| 52-104942 | 9/1977 | Japan . |
| 56-154709 | 11/1981 | Japan . |
| 57-99794 | 6/1982 | Japan . |
| 58-88719 | 6/1983 | Japan . |
| 58-115948 | 7/1983 | Japan . |
| 1381695 | 1/1975 | United Kingdom . |

OTHER PUBLICATIONS

J. Stone, et al., "Nd:YAG Single–Crystal Fiber Laser: Room–Temperature cw operation using a single LED as an End Pump", *Applied Physics Letters,* vol. 29, No. 1, Jul. 1, 1976, pp. 37–39.

Stone and Burrus, "Neodymium—Doped Fiber Lasers: Room Temperature cw Operation With an Injection Laser Pump" *Applied Optics,* vol. 13, No. 6, Jun., 1974, pp. 1256–1258.

S. E. Miller and A. G. Chynoweth, Editors, "Neodymium Lasers" (Chapter 16) *Optical Fiber Telecommunications,* Academic Press, 1979, pp. 538–556.

Digonnet and Shaw, "Wavelength Multiplexing in Single–Mode Fiber Couplers", Applied Optics, (Feb., 1983), vol. 22, No. 3, pp. 484–491.

(List continued on next page.)

*Primary Examiner*—John D. Lee

[57] ABSTRACT

An amplifier for use with fiber optic systems comprises a neodymium YAG crystal placed in series with a signal-carrying optical fiber. The ND:YAG crystal is supplied by the optical fiber with both the signal to be amplified, and pumping illumination. The pumping illumination is coupled onto the optical fiber by a multiplexing coupler which is used to combine the signal to be amplified and illumination from a pumping illumination source onto a single optical fiber. The pumping illumination inverts the neodymium ions within the ND:YAG crystal. The signal to be amplified propagates through this crystal to stimulate emission of coherent light from the neodymium ions, resulting in amplification of the signal. Because this arrangement permits the ND:YAG crystal to be end-pumped with pumping illuminations, and because the length of the ND:YAG crystal may be substantially greater that the absorption length for the crystal at the wavelength of the pumping illumination, virtually all of the pumping illumination may be absorbed within the ND:YAG crystal and used for amplification of the signal carried by the optical fiber.

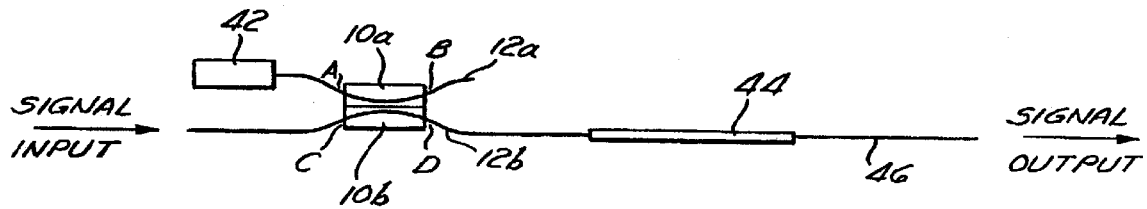

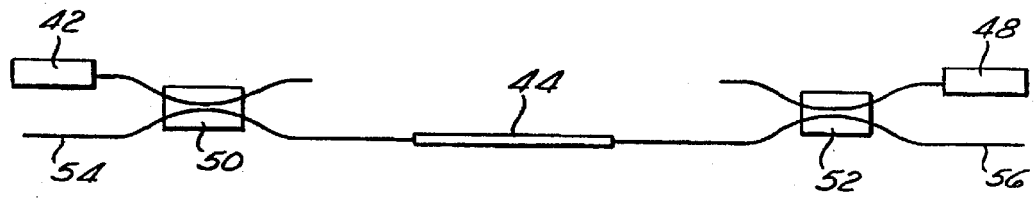

OTHER PUBLICATIONS

Winzer, G., "Wavelength Division Multiplexing—Status and Trends", (Sep., 1982), ECOC82, pp. 305–314.

Digonnet and Shaw, "Analysis of a Tunable Single–Mode Optical Fiber Coupler" IEEE Journal of Quantum Electronics, (Apr., 1982), vol. QE–18, No. 4.

Sorin, Jackson, and Shaw, "Evanescent Amplification in a Single–Mode Optical Fibre", Electronics Letters, (Sep., 1983), vol. 19, No. 20, pp. 820–822.

Kawasaki, Hill, and Lamont, "Biconical–Taper Single–Mode Fiber Coupler", Optic Letters, (Jul., 1981), vol. 6, No. 7, pp. 327–328.

Lamoroux, Orszag, Prade, and Vinet, "Continuous Laser Amplification in a Monomode Fiber Longitudinally Pumped by Evanescent Field Coupling", Optics Letters, (Sep., 1983), vol. 8, No. 9, pp. 504–505.

Stone and Burrus, "Neodynium–Doped Silica Lasers in End–Pumped Fiber Geometry", Applied Physics Letters, (Oct. 1973), vol. 23, No. 7, pp. 388–389.

Koester and Snitzer, "Amplification in a Fiber Laser", Applied Optics (Oct., 1964), vol. 3, No. 10, pp. 1182–1186.

Burrus and Stone, "Single–Crystal Fiber Optical Devices: A Nd:YAG Fiber Laser", Applied Physics Letters, (Mar., 1975), vol. 26, No. 6, pp. 318–320.

Barrekette, "Optical Waveguides and Integrated Optics", (Oct., 1971), OSA Annual Mtg., Paper No. ThK12.

Digonnet and Shaw, "Nd:YAG Single Crystal Fiber Lasers", (Oct., 1983), 2nd Eur. Conf. on Int. Optics, pp. 34–37.

Injeyan, Stafsudd, and Alexopolous, "Light Amplification by Evanescent Wave Coupling in a Multimode Fiber", Applied Optics (Jun., 1982), vol. 21, No. 11.

Aoki, et al., "Efficient Backward and Forward Pumping CW Raman Amplification for InGaAsP Laser Light in Silica Fibres", Electronics Letters, (Aug., 1983), vol. 19, No. 16, pp. 620–622.

Ross and Snitzer, "Optical Amplification of $1.06\mu$ $InAs_{1-x}P_x$ Injection–Laser Emission", Journal of Quantum Electronics, (Jun., 1970), vol. QE–6, No. 6.

Koester, Laser Action by Enhanced Total Internal Reflection, IEEE Journal of Quantum Electronics, (Sep., 1966), vol. QE–2, No. 9, pp. 580–584.

Shibata et al., "Raman Effect in Optical Fiber Doped with Various Dopants", (Mar. 1980), ICCE Japan Mtg.

Giordmaine, J.A., "The Interaction of Light with Light", (1983) and corresponding Japanese counterpart, pp. 38–49, No journal name.

Ino et al., "Fabrication and Fundamental Properties of Nd:YAG Thin Film by RF Sputtering for Waveguide Type Optical Amplifier", (Nov. 1981), IEC Tech. Res. Report.

Sadakuni Shimada, et al., "Optical Fiber Transmission Technology," Information Process, vol. 18, No. 3, pp. 273–280, May 1977.

H. Yanai, Optical Communication Handbook (1982), pp. 244–249.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–15 is confirmed.

Claims 1, 2, 5 and 6 are cancelled.

Claims 3 and 4 are determined to be patentable as amended.

New claims 16–22 are added and determined to be patentable.

3. A fiber optic amplifier [as defined in claim 2, wherein] *comprising:*
   *an optical fiber comprised of a material which will emit light in response to pumping;*
   *a source of signals to be amplified comprising light at a frequency of said emitted light;*
   *a source of light for pumping said material; and*
   *means for coupling both said signals and said light for pumping into an end of said optical fiber, said means for coupling comprising an optical coupler,* said optical coupler [comprises] *being highly wavelength discriminating and comprising* a single-mode optical coupler having a plurality of input/output ports comprised of respective single mode fiber portions, one of said ports being coupled to said optical fiber so as to transmit both pump light and signals to be amplified between said optical coupler and said material which will emit light in response to pumping, a second of said ports being coupled to transmit said pump light from the pump source to said optical fiber, and a third of said ports transmitting said signals to be amplified.

4. A fiber optic amplifier [as defined in claim 2 in which said]*, comprising:*
   *an optical fiber comprised of a material which will emit light in response to pumping;*
   *a source of signals comprising light at a frequency of said emitted light;*
   *a source of light for pumping said material; and*
   *means for coupling both said signals and said light for pumping into an end of said optical fiber, said coupling means comprising an* optical coupler *which* utilizes evanescent field coupling.

16. *The fiber optic apparatus of claim 11, wherein said source of light for pumping is coupled to said optical fiber such that said pump light propagates through said laser material in a propagation direction to pump said laser material, whereby a population inversion is created in the laser material, and wherein said optical fiber receives signals to be amplified for propagation in the same propagation direction as said light for pumping, whereby relaxation of the population inversion in said laser material amplifies said signals as said signals propagate in said propagation direction.*

17. *The fiber optic apparatus of claim 11, wherein said optical fiber has a first propagation direction and a second propagation direction opposite said first propagation direction, and wherein said source of pump light is coupled to said optical fiber such that said pump light propagates through said laser material in at least said first propagation direction to pump said laser material, whereby a population inversion is created in said laser material, and wherein said optical fiber receives signals to be amplified for propagation in at least said second direction, whereby relaxation of the population inversion in said laser material amplifies said signals as said signals propagate in said second propagation direction.*

18. *The fiber optic apparatus of claim 17, wherein said apparatus comprises a second source of pump light coupled to said optical fiber such that pump light from the second source propagates through said laser material in said second direction.*

19. *The fiber optic apparatus of claim 11, wherein said optical fiber has a diameter that at least approaches single mode to increase pump light density and thereby increase population inversions in said laser material as said pump light propagates within said diameter through said laser material.*

20. *The fiber optic apparatus of claim 11, wherein the optical fiber is formed substantially entirely of said laser material.*

21. *The fiber optic apparatus of claim 11, wherein said ports comprise respective portions of single mode optical fiber.*

22. *The fiber optic apparatus of claim 21, wherein said optical coupler utilizes evanescent field coupling.*

* * * * *

(12) EX PARTE REEXAMINATION CERTIFICATE (6821st)
United States Patent
Shaw et al.

(10) Number: US 4,859,016 C2
(45) Certificate Issued: May 12, 2009

(54) FIBER OPTIC AMPLIFIER

(75) Inventors: Herbert J. Shaw, Stanford, CA (US);
Michel J. F. Digonnet, Palo Alto, CA (US)

(73) Assignee: The Board of Trustees of the Leland Stanford Junior University

Reexamination Request:
No. 90/006,726, Jul. 24, 2003
No. 90/007,147, Jul. 30, 2004

Reexamination Certificate for:
Patent No.: 4,859,016
Issued: Aug. 22, 1989
Appl. No.: 07/137,860
Filed: Dec. 22, 1987

Reexamination Certificate B1 4,859,016 issued Nov. 7, 2000

Related U.S. Application Data

(62) Division of application No. 06/930,136, filed on Nov. 12, 1986, now Pat. No. 4,723,824, which is a division of application No. 06/554,888, filed on Nov. 25, 1983, now Pat. No. 4,674,830.

(51) Int. Cl.
*G02B 6/26* (2006.01)
*H01S 3/067* (2006.01)

(52) U.S. Cl. .................. 385/5; 359/341.3; 359/342; 359/349; 372/6; 372/69

(58) Field of Classification Search .................. 385/4, 385/5, 15, 27, 28, 30, 31, 38, 39, 122, 126, 385/127, 42; 372/3, 6, 69, 70, 71, 94; 359/333, 359/341, 342, 343, 345
See application file for complete search history.

(56) References Cited

U.S. PATENT DOCUMENTS 3,705,992 A 12/1972 Ippen et al.

(Continued)

FOREIGN PATENT DOCUMENTS

GB 1381695 * 1/1975

(Continued)

OTHER PUBLICATIONS

J. Stone, et al., "Nd: YAG Single–Crystal Fiber Laser: Room Temperature cw operation using a single LED as an End Pump". *Applied Physics Letters*, vol. 29, No. 1, Jul. 1, 1976, pp. 37–39.

(Continued)

*Primary Examiner*—Margaret Rubin

(57) ABSTRACT

An amplifier for use with fiber optic systems comprises a neodymium YAG crystal placed in series with a signal-carrying optical fiber. The ND:YAG crystal is supplied by the optical fiber with both the signal to be amplified, and pumping illumination. The pumping illumination is coupled onto the optical fiber by a multiplexing coupler which is used to combine the signal to be amplified and illumination from a pumping illumination source onto a single optical fiber. The pumping illumination inverts the neodymium ions within the ND:YAG crystal. The signal to be amplified propagates through this crystal to stimulate emission of coherent light from the neodymium ions, resulting in amplification of the signal. Because this arrangement permits the ND:YAG crystal to be end-pumped with pumping illuminations, and because the length of the ND:YAG crystal may be substantially greater than the absorption length for the crystal at the wavelength of the pumping illumination, virtually all of the pumping illumination may be absorbed within the ND:YAG crystal and used for amplification of the signal carried by the optical fiber.

At the time of issuance and publication of this certificate, the patent remains subject to pending reexamination control numbers 90/008,744 and 90/008,941 filed Sep. 20, 2007 and Nov. 28, 2007 respectively. The claim content of the patent may be subsequently revised in the reexamination proceedings.

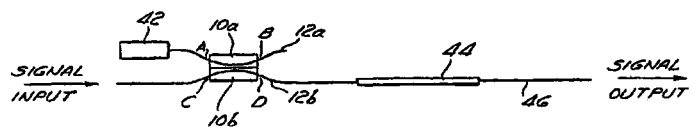

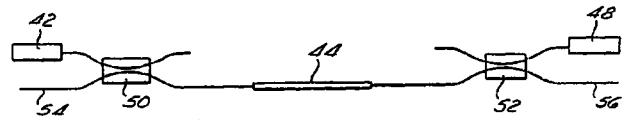

U.S. PATENT DOCUMENTS

| | | | | |
|---|---|---|---|---|
| 3,826,992 | A | 7/1974 | Friedl | 330/4.3 |
| 4,136,929 | A | 1/1979 | Suzaki | |
| 4,243,297 | A | 1/1981 | Elion | |

FOREIGN PATENT DOCUMENTS

| | | | | |
|---|---|---|---|---|
| JP | 52-104942 | 9/1977 | | |
| JP | 56-154709 | 11/1981 | | |
| JP | 57-084311 | 5/1982 | | 385/42 X |
| JP | 5799794 | 6/1982 | | |
| JP | 57-99794 | 6/1982 | | 385/42 X |
| JP | 58-88719 | 5/1983 | | |
| JP | 58-115948 | 7/1983 | | |

OTHER PUBLICATIONS

Stone and Burrus, "Neodymium–Doped Fiber Lasers: Room Temperature cw Operation With An Injection Laser Pump" *Applied Optics*, vol. 13, No. 6, Jun., 1974, pp. 1256–1258.

S.E. Miller and A.G. Chynoweth, Editors, "Neodymium Lasers" (Chapter 16) *Optical Fiber Telecommunications*, Academic Press, 1979, pp. 538–556.

Digonnet and Shaw, "Wavelength Multiplexing in Single–Mode Fiber Couplers", *Applied Optics*, (Feb., 1983), vol. 22, No. 3, pp. 484–491.

Winzer, G., "Wavelength Division Multiplexing—Status and Trends", (Sep. 1982), ECOC82, pp. 305–314.

Digonnet and Shaw, "Analysis of a Tunable Single–Mode Optical Fiber Coupler" *IEEE Journal of Quantum Electronics*, (Apr., 1982), vol. QE–18, No. 4.

Sorin, Jackson and Shaw, "Evanescent Amplification in a Single–Mode Optical Fibre", *Electronics Letters*, (Sep., 1983), vol. 19, No. 20, pp. 820–821.

Kawasaki, Hill and Lamont, "Biconical–Taper Single–Mode Fiber Coupler", *Optic Letters*, (Jul., 1981), vol. 6, No. 7, pp. 327–328.

Lamoroux, Orszag, Prade and Vincent, "Continuous Laser Amplification in a Monomode Fiber Longitudinally Pumped by Evanescent Field Coupling", *Optics Letters*, (Sep., 1983), vol. 8, No. 9, pp. 504–505.

Stone and Burrus, "Neodynium–Doped Silica Lasers in End–Pumped Fiber Geometry", *Applied Physics Letters*, (Oct.,1973), vol. 23, No. 7, pp. 388–389.

Koester and Snitzer, "Amplification in a Fiber Laser", *Applied Optics* (Oct., 1964), vol. 3, No. 10, pp. 1182–1186.

Burrus and Stone, "Single–Crystal Fiber Optical Devices: A Nd:YAG Fiber Laser", *Applied Physics Letters*, (Mar., 1975), vol. 26, No. 6, pp. 318–320.

Barrekette, "Optical Waveguides and Integrated Optics", (Oct. 1971), *OSA Annual Mtg.*, Paper No. ThK12.

Digonnet and Shaw, "Nd:YAG Single Crystal Fiber Lasers", (Oct., 1983), *2nd Eur. Conf. on Int. Optics*, pp. 34–37.

Injeyan, Stafsudd and Alexopolous, "Light Amplification by Evanescent Wave Coupling in a Multimode Fiber", *Applied Optics* (Jun., 1982), vol. 21, No. 11.

Aoki, et al., "Efficient Backward and Forward Pumping CW Raman Amplification for InGaAsP Laser Light in Silica Fibres", *Electronics Letters*, (Aug., 1983), vol. 19, No. 16, pp. 620–622.

Ross and Snitzer, "Optical Amplification of 1.06µInAsP Injection–Laser Emission", *Journal of Quantum Electronics*, (Jun., 1970), vol. QE–6, No. 6.

Koester, Laser Action by Enhanced Total Internal Reflection, *IEEE Journal of Quantum Electronics*, (Sep., 1966), vol. QE–2, No. 9, pp. 580–584.

Shibata et al., "Raman Effect in Optical Fiber Doped with Various Dopants", (Mar. 1980), ICCE Japan Mtg.

Giordmaine, J.A., "The Interaction of Light with Light", and corresponding Japanese counterpart, Scientific American, vol. 210, No. 4, (Apr., 1964), pp. 38–49.

Ino et al., "Fabrication and Fundamental Properties of Nd:YAG Thin Film by RF Sputtering for Waveguide Type Optical Amplifier", (Nov. 1981), IEC Tech. Res. Report.

Sadakuni Shimada et al., "Optical Fiber Transmission Technology", Information Process, (May 1977), vol. 18, No. 3, pp. 273–280.

H. Yanai, Optical Communication Handbook (1982), pp. 244–249.

O. Parriaux, et al., "Wavelength Selective Distributed Coupling Between Single Mode Optical Fibers for Multiplexing," *J. Opt. Commun*, 2 (1981) 3, 105–109.

O. Parriaux, et al., "Coupling and Multiplexing Between Single Mode Optical Fibers," Fiber–Optic Rotation Sensors and Related Technologies, Proceedings of the First International Conference, MIT, Cambridge Mass, Nov. 9–11, 1981, Editors S. Ezekiel et al., pp. 144–148.

M.J.F. Digonnet, et al., "Single–mode fiber–optic wavelength multiplexer", Fifth Topical Meeting on Optical Fiber Communication, Apr. 13–15, 1982 OSA/IEEE, Phoenix, AZ, Digest of Technical Papers, pp. 36–37 and 78–78 and 78–79.

P.R. Hammond, "Laser Dye DCM, Its Spectral Properties, Synthesis and Comparison with Other Dyes in the Red," *Optics Communications*, vol. 29, No. 3, Jun. 1979, pp. 331–333.

*Optical Fiber Systems: Technology, Design and Applications.* Charles K. Kao (1982); Table of Contents and Chapter 7.

*McGraw–Hill Dictionary of Scientific and Technical Terms* (Third Edition), Ed. Sybil Parker (1984), pp. 376 and 1249.

\* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 3, 4 and 7–22 is confirmed.

Claims 1, 2, 5 and 6 were previously cancelled.

\* \* \* \* \*

(12) EX PARTE REEXAMINATION CERTIFICATE (7230th)
United States Patent
Shaw et al.

(10) Number: US 4,859,016 C3
(45) Certificate Issued: Dec. 8, 2009

(54) FIBER OPTIC AMPLIFIER

(75) Inventors: Herbert J. Shaw, Stanford, CA (US); Michel J. F. Digonnet, Palo Alto, CA (US)

(73) Assignee: The Board of Trustees of the Leland Stanford Junior University

Reexamination Request:
No. 90/008,744, Sep. 20, 2007
No. 90/008,941, Nov. 28, 2007

Reexamination Certificate for:
Patent No.: 4,859,016
Issued: Aug. 22, 1989
Appl. No.: 07/137,870
Filed: Dec. 22, 1987

Reexamination Certificate B1 4,859,016 issued Nov. 7, 2000

Reexamination Certificate C2 4,859,016 issued May 12, 2009

Related U.S. Application Data

(62) Division of application No. 06/930,136, filed on Nov. 12, 1986, now Pat. No. 4,723,824, which is a division of application No. 06/554,888, filed on Nov. 25, 1983, now Pat. No. 4,674,830.

(51) Int. Cl.
| | |
|---|---|
| H01S 3/0915 | (2006.01) |
| H01S 3/0933 | (2006.01) |
| H01S 3/094 | (2006.01) |
| H01S 3/067 | (2006.01) |
| H01S 3/06 | (2006.01) |
| H04B 10/17 | (2006.01) |
| H04J 14/02 | (2006.01) |

(52) U.S. Cl. .................. 385/5; 359/341.3; 359/342; 359/349; 372/6; 372/69

(58) Field of Classification Search ................. None
See application file for complete search history.

(56) References Cited

U.S. PATENT DOCUMENTS

| 3,230,474 A | 1/1966 | Keck et al. |
| 3,456,211 A | 7/1969 | Koester |
| 3,705,992 A | 12/1972 | Ippen et al. |

(Continued)

FOREIGN PATENT DOCUMENTS

DE     1439469     11/1968

(Continued)

OTHER PUBLICATIONS

Albrecht, et al., *Design and Characterization of a High Average Power Slab YAG Laser*, IEEE Journal of Quantum Electronics, vol. QE22, No. 11, pp. 2099–2106 (Nov. 1986).

(Continued)

*Primary Examiner*—James Menefee

(57) ABSTRACT

An amplifier for use with fiber optic systems comprises a neodymium YAG crystal placed in series with a signal-carrying optical fiber. The ND:YAG crystal is supplied by the optical fiber with both the signal to be amplified, and pumping illumination. The pumping illumination is coupled onto the optical fiber by a mutliplexing coupler which is used to combine the signal to be amplified and illumination from a pumping illumination source onto a single optical fiber. The pumping illumination inverts the neodymium ions within the ND:YAG crystal. The signal to be amplified propagates through this crystal to stimulate emission of coherent light from the neodymium ions, resulting in amplification of the signal. Because this arrangement permits the ND:YAG crystal to be end-pumped with pumping illuminations, and because the length of the ND:YAG crystal may be substantially greater than the absorption length for the crystal at the wavelength of the pumping illumination, virtually all of the pumping illumination may be absorbed within the ND:YAG crystal and used for amplification of the signal carried by the optical fiber.

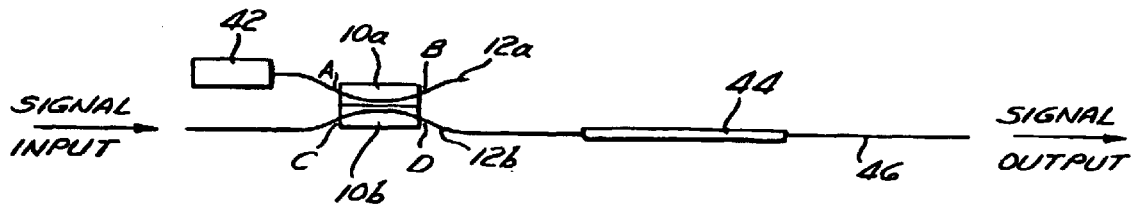

U.S. PATENT DOCUMENTS

| | | | |
|---|---|---|---|
| 3,731,255 A | 5/1973 | Wild et al. |
| 3,753,145 A | 8/1973 | Chesler |
| 3,808,549 A | 4/1974 | Maurer |
| 3,826,992 A | 7/1974 | Freidl |
| 3,851,268 A | 11/1974 | Singh et al. |
| 3,902,130 A | 8/1975 | Pike |
| 3,914,709 A | 10/1975 | Pike et al. |
| 3,950,707 A | 4/1976 | Hill et al. |
| 3,957,341 A | 5/1976 | Taylor |
| 3,975,692 A | 8/1976 | Mego, Jr. et al. |
| 4,015,217 A | 3/1977 | Snitzer |
| 4,039,851 A | 8/1977 | Jain et al. |
| 4,040,890 A | 8/1977 | Burrus et al. |
| 4,044,315 A | 8/1977 | Snitzer |
| 4,054,366 A | 10/1977 | Barnoski et al. |
| 4,063,106 A | 12/1977 | Ashkin et al. |
| 4,107,628 A | 8/1978 | Hill et al. |
| 4,136,929 A | 1/1979 | Suzaki |
| 4,243,297 A | 1/1981 | Elion |
| 4,243,398 A | 1/1981 | Nomura et al. |
| 4,244,045 A | 1/1981 | Nosu et al. |
| 4,258,336 A | 3/1981 | Fletcher et al. |
| 4,291,940 A | 9/1981 | Kawasaki et al. |
| 4,300,811 A | 11/1981 | Ettenberg et al. |
| 4,301,543 A | 11/1981 | Palmer |
| 4,307,933 A | 12/1981 | Palmer et al. |
| 4,325,636 A | 4/1982 | Schiffner |
| 4,327,971 A | 5/1982 | Kondo et al. |
| 4,335,933 A | 6/1982 | Palmer |
| 4,343,532 A | 8/1982 | Palmer |
| 4,362,359 A | 12/1982 | Dammann et al. |
| 4,373,782 A | 2/1983 | Thelen |
| 4,383,318 A | 5/1983 | Barry et al. |
| 4,392,712 A | 7/1983 | Ozeki |
| 4,401,364 A | 8/1983 | Mochizuki |
| 4,431,260 A | 2/1984 | Palmer |
| 4,479,701 A | 10/1984 | Newton et al. |
| 4,483,582 A | 11/1984 | Sheem |
| 4,515,431 A | 5/1985 | Shaw et al. |
| 4,546,476 A | 10/1985 | Shaw et al. |
| 4,554,510 A | 11/1985 | Shaw et al. |
| 4,556,279 A | 12/1985 | Shaw et al. |
| 4,560,249 A | 12/1985 | Nishiwaki et al. |
| 4,603,940 A | 8/1986 | Shaw et al. |
| 4,674,830 A | 6/1987 | Shaw et al. |
| 4,723,824 A | 2/1988 | Shaw et al. |

FOREIGN PATENT DOCUMENTS

| | | |
|---|---|---|
| EP | 0112090 | 6/1954 |
| EP | 0038023 | 10/1981 |
| EP | 0079196 | 5/1983 |
| GB | 1094639 | 12/1967 |
| GB | 1381695 | 1/1975 |
| JP | 50-256 | 1/1975 |
| JP | 52-104942 | 9/1977 |
| JP | 53-91752 | 11/1978 |
| JP | 55-76308 | 6/1980 |
| JP | 56-154709 | 11/1981 |
| JP | 57-85004 | 5/1982 |
| JP | 57-99794 | 6/1982 |
| JP | 57-084311 | 6/1982 |
| JP | 58-88719 | 5/1983 |
| JP | 58-115948 | 7/1983 |

OTHER PUBLICATIONS

Alferness, et al., *Filter Characteristics of Codirectionally Coupled Waveguides with Weighted Coupling*, IEEE Journal of Quantum Electronics (Nov. 1978), pp. 843–847, QE–14, 11.

Belt, et al., *Preparation of Rare Earth Doped YAG Laser Materials*, Final Report, Office of Naval Research, Contract No. N00173–79–C–0134 (May 1, 1979–Oct. 1, 1981).

Bergh, *All–fiber gyroscope with optical–kerr–effect compensation*, dissertation for Stanford University (May 1983).

Bergh, et al., *All–Single–Mode Fiber–Optic Gyroscope*, Optical Society of America (Apr. 1981).

Bergh, et al., *Single mode fiber optic components*, Conference on Lasers and Electro–Optics (Jun. 10–12, 1981), Washington D.C.

Bergh, et al., *Single–mode fiber optic polarizer*, Optics Letters (Nov. 1980), pp. 479–481, vol. 5.

Bergh, et al., *All–Single–Mode Fiber–Optic Gyroscope with Long–Term Stability*, Optics Letters (Oct. 1981) pp. 502–504, vol. 6, No. 10.

Bergh, et al., *Single mode fiber optic components*, SPIE Proceedings on Fiber Optics Technology, (1982), pp. 137–142, vol. 326.

Bergh, et al., *Single mode fiber optic components, in fiber optic rotation Sensors and related technologies*, Springer Series in Optical Sciences, (1982), pp. 136–143, vol. 32, Springer–Verlag, New York (S. Ezekiel and H. J. Arditty, eds.).

Bergh, et al., *All–single–mode fiber–optic gyroscope*, Opt. Lett. (1981) pp. 198–200, vol. 6, No. 4.

Bergh, et al., *Single–Mode Fiber Optic Polarizer*, Stanford University (Aug. 1980) preprint submitted for publication in Optics Letters.

Birnbaum, et al., *Laser emission cross section of Nd:YAG at 1064 nm*, J. of Applied Physics, (Mar. 1981) pp. 1212–1215, vol. 52, No. 3.

Boiko, et al., *Shift in the Frequency of Maximum Amplification Upon the Reflection of Light from an Inverse Medium*, Plenum Publishing (1983) pp. 640–645.

Bondarenko, et al., *Amplifiers for Neodymium Laser Systems with a Homogeneous Distribution of the Gain*, Soviet Journal of Quantum Electronics, pp. 1252–1254 (Sep. 1981).

Bunkenberg, et al., *The Omega High–Power Phosphate–Glass System: Design and Performance*, IEEE Journal of Quantum Electronics, vol. QE17, No. 9, pp. 1620–1628 (Sep. 1981).

Burrus, et al., *Room Temperature Continuous Operation of a Ruby Fiber Laser*, J. of Applied Physics (Jun. 1978) vol. 49, No. 6, pp. 3118–3125.

Chesler, et al., *Performance model for end–pumped miniature Nd:YAG laser*, J. Appl. Phys, (1973) pp. 5441–5443, vol. 44, No. 12.

Chesler, et al., *Miniature Diode–Pumped Nd:YAlG lasers*, Applied Physics Letters (Sep. 1973) pp. 235–236, vol. 23.

Chodorow, et al., Annual Progress Report, Joint Services Electronics Program of the Edward L. Ginzton Laboratory of Stanford University, Contract No. N00014–75–C–0632 (Apr. 1, 1979–Mar. 31, 1980) Office of Naval Research.

Chraplyvy, et al., *Optical Gain Exceeding 35 dB at 1.56 um due to Stimulated Raman Scattering by Molecular D2 in a Solid Silica Optical Fiber*, Optics Letters (Jul. 1983).

Desurvire, et al., *High–Gain Optical Amplification Of Laser Diode Signal By Raman Scattering In Single–Mode Fibres*, Electronics Letters, Sep. 15, 1983, pp. 751–753, vol. 19, Issue 19.

Desurvire, et al., *High–Gain Erbium–Doped Traveling–Wave Fiber Amplifier*, Optics Letters, (Nov. 1987), vol. 12, No. 11, pp. 888–890.

Digonnet, et al., *Research on New Approaches to Optical Systems for Inertial Rotation Sensing*, AirForce Office of Scientific Research, Grant No. AFOSR–F49620–82–K–0029 (May 1, 1982–Jun. 30, 1983).

Digonnet, et al., *Analysis of a Tunable Single Mode Optical Fiber Coupler*, IEEE Journal of Quantum Electronics (Apr. 15, 1982) vol. QE–18, No. 4, pp. 745–754.

Digonnet, et al., *Fiber Ring Laser Gyro Amplifier*, Final Technical Report AFWAL–TR–81–1067, Jun. 1981.

Digonnet, et al., *Diode Pumped Fiber Laser*, Final Technical Report AFWALTR–83–1110, Jul. 1983.

Draegert, *Single–Diode End–Pumped Nd:YAG Laser*, IEEE Journal of Quantum Electronics (Dec. 1973) pp. 1146–1149, vol. 9, No. 12.

Dudko, et al., *Generation of Light in Optical Fibers Made of Glasses Formed from Rare–Earth Ultraphosphate Crystals*, Sov. J. Quantum Electron—American Institute of Physics, Sep. 1982, pp. 1210–1211, vol. 12, No. 9.

Eggleston, et al., *Slab Geometry Nd:Glass Laser Performance Studies*, Optics Letters, vol. 7, No. 9, pp. 405–407 (Sep. 1982).

Feit, et al, *Propagating beam theory of optical fiber cross coupling*, J. Opt. Soc. Am., Nov. 1981, pp. 1361–1372, vol. 71, No. 11.

Fejer, et al., *Growth and characterization of single crystal refractory oxide fibers*, Technical digest of SPIE, Jan. 1982, pp. 50–55, vol. 320.

Findakly, et al., *Optical directional couplers with variable spacing*, Appl. Opt., Mar. 1, 1978, pp. 769–773, vol. 17.

Gambling, et al., *Field deformation in a curved single–mode fibre*, Electron. Lett., Mar. 2, 1978, pp. 130–132, vol. 14, No. 5.

Giallorenzi, et al., *Optical Fiber Sensor Technology*, IEEE Journal of Quantum Electronics, Apr. 1982, pp. 626–665, vol. QE–18, No. 4.

Hamano, et al., *Optical Guided Wave Dye Laser and Directional Coupling Amplifier*, The Transactions of the IECE of Japan, 1982, pp. 193–198, vol. J65—C, No. 3.

Harris, et al., *Techniques for rapid induced energy transfer using metastable states*, Proceedings of the International Conference on Lasers '78, 1978, pp. 679–688.

Hill, et al., *Low–threshold cw Raman laser*, Applied Physics Letters, Aug. 1976, pp. 181–183, vol. 29, No. 3.

Hsu, et al., *Single Mode Optical Fiber Pickoff Coupler*, Applied Optics, Oct. 1976, pp. 2310–2312, vol. 15, No. 10.

Huff, et al., *A Mode–Locked, Sun–Pumped Nd:YAG Laser*, International Electron Devices Meeting, 1971, p. 116, vol. 17 (Abstract only).

Injeyan, et al., *Amplification of light propagating through a fiber by evanescent wave coupling*, in Technical Digest of CLEO '81, Jun. 1981, article THJ5.

Ippen, et al., *Evanescent–Field–Pumped Dye Laser*, Applied Physics Letters, Oct. 1972, pp. 301–302, vol. 21, No. 7.

Iwamoto, et al., *Room Temperature cw Operated Superluminescent Diodes for Optical Pumping of Nd:YAG Laser*, Japanese Journal of Applied Physics, Nov. 1976, pp. 2191–2194, vol. 15, No. 11.

Johnson, *In–Line Fiber–Optic Polarizaton Transformer*, Applied Optics, May 1979, pp. 1288–1289, vol. 18, No. 9.

Jones, *Coupling of optical fibers and scattering in fibers*, J. Opt. Soc. Amer., Mar. 1965, pp. 261–271, vol. 55.

Jongsuok, et al., *Optimum Pumping Geometry of Optically–Pumped Submillimeter Wave Lasers*, Japanese Journal of Applied Physics, 1983, p. 1345, vol. 22, No. 8.

Kaminow, et al., *Nd:LiNbO3 laser*, IEEE J. Quant. Electronics, Jun. 1975, pp. 306–308, QE–11, 6.

Kaminow, et al., *Efficient strip–waveguide modulator*, Applied Physics Letters, Nov. 15, 1975, pp. 555–557, vol. 27, No. 10.

Kane, et al., *Miniature Laser Diode Pumped Nd:YAG Lasers*, Stanford University, 1985, pp. 38–41.

Kao, *Optical Fiber Systems: Technology, Design and Applications*, 1982, pp. 117–135, McGraw–Hill, Inc.,New York.

Kawasaki, et al., *Configurations, Performance, and Applications of Biconical Taper of Optical Fibre Coupling Structures*, Canadian Journal of Physics, 1983, pp. 352–360, vol. 61.

Kawasaki, et al., *Low–Loss Access Coupler for Multimode Optical Fiber Distribution Networks*, Appl. Opt., Jul. 1977, pp. 1794–1795, vol. 16.

Kitayama, et al., *Wavelength–Selective Coupling of Two–Core Optical Fiber: Application and Design*, Journal of the Optical Society of America A, Jan. 1985, pp. 90–94, vol. 2, No. 1.

Kitayama, et al., *Two–core optical fibers: experiment*, Journal of the Optical Society of America A, Jan. 1985, pp. 84–89, vol. 2, No. 1.

Koepf, et al., *Raman Amplification at 1.118 um in Single–mode Fibre and its Limitation by Brillouin Scattering*, Electronic Letters, vol. 18, Issue 22, Oct. 28, 1982, pp. 942–943.

Lefevre, *Single–Mode Fibre Fractional Wave Devices and Polarisation Controllers*, Electronics Letters, Sep. 25, 1980, pp. 778–780, vol. 16, No. 20.

Lefevre, et al., *All–Fiber Gyroscope with Inertial–Navigation Short Term Sensitivity*, Optics Letters, Sep. 1982, pp. 484–486, vol. 7, No. 9.

Levine, et al., *Lasers*, Marcel Dekker, Inc. New York (1976) ISBN 0–8247–1410–5.

Liao, et al., *Single–mode fiber coupler*, Applied Optics, Aug. 1, 1981, pp. 2731–2734, vol. 20, No. 15.

Lin, et al., *Near–Infrared Sources in the 1–1.3 μm Region by Efficient Stimulated Raman Emission in Glass Fibres*, Optics Communications, Mar. 1977, pp. 426–428, vol. 20, No. 3.

Lin, et al., *Backward Raman Amplification and Pulse Steepening in Silica Fibers*, Applied Physics Letters, vol. 29, No. 7, Oct. 1976.

Linford, et al., *Measurements and Modeling of Gain Coefficients for Neodymium Laser Glasses*, IEEE Journal of Quantum Electronics, vol. QE15, No. 6, pp. 510–523 (Jun. 1979).

Mears, et al., *Low–Noise Erbium–Doped Fibre Amplifier Operating at 1.54 μm*, Electronics Letters, Sep. 10, 1987, pp. 1026–1028, vol. 23, No. 19.

Mears, et al., *Neodymium–Doped Silica Single–Mode Fibre Lasers*, Electronics Letters, Aug. 15, 1985, pp. 738–740, vol. 21, No. 17.

Moslehi, *Fiber–optic lattice signal processing*, Ginzton Laboratory Report No. 3755, Aug. 1984.

Meltz, et al., *Cross–talk fiber–optic temperature sensor*, Applied Optics, 1983, pp. 464–, vol. 22.

Morey, et al., *Fiber Optic Temperature Sensor*, ISA, May 1983, pp. 261–274.

Multiple Authors, *Research on New Approaches to Optical Systems for Inertial Rotation Sensing*, AirForce Office of Scientific Research Bolling AirForce Base, Grant No. AFOSR F49620–80–C–0040 (Jan. 1, 1981–Apr. 30, 1982).

Murakami, *Coupling Between Curved Dielectric Waveguides*, Applied Optics, Feb. 1980, pp. 398–403, vol. 19, No. 3.

Murakami, et al., *Coupling Characteristics Measurements Between Curved Waveguides Using a Two–Core Fiber Coupler*, Applied Optics, Feb. 1981, pp. 417–422, vol. 20, No. 3.

Murray, *Pulsed Gain and Thermal Lensing of Nd:LiYF₄*, IEEE Journal of Quantum Electronics, vol. QE19, No. 4, pp. 488–491 (Apr. 1983).

Newton, et al., *Single–Mode Fiber 1×N Directional Coupler*, Optics Letters, Jan. 1983, pp. 60–62, vol. 8, No. 1.

Onstott, et al., *Electron Beam Pumped Laser Emission from ZnSxSe*, IEEE Journal of Quantum Electronics, Mar. 1977, pp. 88–89.

Ostermayer, *LED End Pumped Nd:YAG Lasers*, IEEE Journal of Quantum Electronics, Jan. 1977, pp. 1–6, vol. QE–13, No. 1.

Otsuka, *Analysis of a Multistable Semiconductor Light Amplifier*, IEEE Journal of Quantum Electronics, Jul. 1983, pp. 1184–1186, vol. QE–19, No. 7.

Ozeki, et al., *New star coupler compatible with single multimode–fiber data links*, Electron. Lett., Mar. 18, 1976, pp. 151–152, vol. 12, No. 6.

Packard, et al., *Standing Waves and Single–Mode Room–Temperature Laser Emission from Electron–Beam Pumped Cadmium Sulfide*, IEEE Journal of Quantum Electronics, Jan. 1969, pp. 44–47, vol. QE–5, No. 1.

Papuchon, et al., *Electrically switched optical directional coupler: Cobra*, Appl. Phys. Lett., Sep. 1, 1975, pp. 289–291, vol. 27.

Parriaux, et al., *Coupling and Multiplexing Between Single Mode Optical Fibers*, Institut National Polytechnique de Grenoble, ENSIEG, BP 46 F–38402 St. Martin d'Heres, France.

Parriaux, et al., *Fiber–Optic Polarizer Using Plasmon—Guided Wave Resonance*, Institut National Polytechnique de Grenoble, 1981.

Parriaux, et al., *Distributed coupling on polished single–mode optical fibers*, Appl. Opt., Jul. 15, 1981, pp. 2420–2423, vol. 20.

Pavlath, et al. *Research on new approaches to optical systems for inertial rotation sensing*, Final Report, AirForce Office of Scientific Research, Grant No. AFOSR–76–3070 (Oct. 1, 1978 to Sep. 30, 1979).

Ponikvar, et al., *Stabilized Single–Frequency Stimulated Brillouin Fiber Ring Laser*, Optics Letters, Aug. 1981, pp. 398–400, vol. 6, No. 8.

Poole, et al., *Fabrication of Low–Loss Optical Fibres Containing Rare–Earth Ions*, Electronics Letters, Aug. 15, 1978, pp. 737–738, vol. 21, No. 17.

Ragdale, et al., *Single–mode Fused Biconical Taper Fibre Couplers*, Proceedings IEE Colloquium in Optical Fibre Sensors 221, Apr. 1983, pp. 75–78.

Reekie, et al., *Tunable Single–Mode Fiber Lasers*, J of Lightwave Tech., vol. LT–4, No. 7 (Jul. 1986).

Rosenkrantz, *GaAs diode pumped Nd:YAG Laser*, J. Appl. Physics, Nov. 1972, pp. 4603–4606, vol. 43, No. 11.

Saruwatari, et al., *Electroluminescent Diode Pumped Miniaturized LiNdP4O12 Lasers*, Review of the Electrical Communication Laboratories, NTT, 1978, pp. 1111–1128, vol. 26, No. 9–1.

Saruwatari, et al., *Electroluminescent Diode Pumped Lithium Neodymium Tetraphosphate Lasers*, Japanese Journal of Applied Physics, 1977, pp. 307–310, vol. 16.

Saruwatari, et al., *LED Pumped Lithium Neodymium Tetraphosphate Lasers*, IEEE Journal of Quantum Electronics, 1976, pp. 584–591, vol. QE–12, No. 10.

Saruwatari, et al., *Miniaturized cw LiNdP4OJ2 laser pumped with a semiconductor laser*, Applied Physics Letters, Sep. 1976, vol. 29, No. 5.

Schiffner, et al., *Double–Core Single–Mode Optical Fiber as Directional Coupler*, Applied Physics, Sep. 1980, pp. 41–45, vol. 23, No. 1.

Schöner et al., *A novel method for making single–mode optical fiber directional couplers*, Electronics Letters, Jun. 24, 1982, pp. 566–568, vol. 18, No. 13.

Sheem, et al., *Single–mode fiber–optical power divider: encapsulated etching technique*, Optics Letters, Jan. 1979, pp. 29–31, vol. 4, No. 1.

Sheem, et al., *Single–mode fiber multiterminal star directional coupler*, Applied Physics Letters, Jul. 1979, pp. 131–133, vol. 35, No. 2.

Sheem, *Fiber–Optic Gyroscope with [3×3] Directional Coupler*, Applied Physics Letters, Nov. 1980, pp. 869–871, vol. 37, No. 10.

Sipes, *Highly efficient neodymium: yttrium aluminum garnet laser end pumped by a semiconductor laser array*, Applied Physics Letters, Jul. 1985, pp. 74–76, vol. 47, No. 2.

Sipes, *Nd:YAG End Pumped by Semiconductor Laser Arrays for Free Space Optical Communications*, IEEE, 1985, pp. 104–108.

Sitnikov, et al., *High–Power Neodymium Phosphate Glass Telescopic Amplifier of Single–Pulse Radiation*, Soviet Journal of Quantum Electronics, pp. 749–754 (Jun. 1983).

Slonecker, M. H., *Single–mode fused biconical taper coupler*, Optical Fiber Communication, 1982 OSA Technical Digest Series (Optical Society of America, 1982), paper WBB7.

Snyder, *Asymptotic Expressions for Eigenfunctions and Eigenvalues of a Dielectric or Optical Waveguide*, IEEE Transactions on Microwave Theory and Techniques, Dec. 1969, pp. 1130–1138. vol. MIT–17, No. 12.

Snyder, A. W., *Understanding monomode optical fibers*, Proc. IEEE, Jan. 1981, pp. 6–13, vol. 69, No. 1.

Sohler, et al., *Optical parametric amplification in Ti–diffused LiNhO $ waveguides*, Applied Physics Letters, Aug. 1, 1980, pp. 255–257, vol. 37, No. 3.

Stevenson, et al., *Optical–fibre waveguide with a single–crystal core*, Electronics Letters, Oct. 13, 1974, pp. 449–450, vol. 10, No. 22.

Stokes, et al., *Sensitive All–Single–Mode–Fiber Resonant Ring Interferometer*, IEEE Journal of Lightwave Technology, Mar. 1983, pp. 110–115, vol. LT–1, No. 1.

Stokes, et al., *All–Fiber Stimulated Brillouin Ring Laser with Submilliwatt Pump Threshold*, Optics Letters, Oct. 1982, pp. 509–511, vol. 7, No. 10.

Stolen et al., *Raman oscillation in glass optical waveguides*, Applied Physics Letters, Jan. 15, 1972, pp. 62–64, vol. 20, No. 2.

Stone et al., *Self–contained LED–pumped single–crystal Nd:YAG fiber laser*, Fiber and Integrated Optics, 1979, pp. 19–46, vol. 2, No. 1.

Stone, J., *cw Raman Fiber Amplifier*, Applied Physics Letters, Feb. 1975, pp. 163–165, vol. 26, No. 4.

Stone, et al., *Self–Contained LED–Pumped Single–Crystal Nd:YAG Fiber Laser* (Feb. 1977).

Stone, et al., *Single–Crystal Nd:YAG Fiber Laser End–Pumped CW with a Light–Emitting Diode*, Optical Electronics 11, 1976, p. 87.

Sudo, *Optical Fiber Amplifiers, Materials, Devices, and Applications* 13–14, 1997, Artech House, Boston.

Trebino, Rick, *Second harmonic generation rings and refractive index measurement in uniaxial crystals*, Applied Optics, Jun. 15, 1981.

Tsujimoto, et al., *Fabrication of Low–Loss 3dB Couplers with Multimode Optical Fibres*, Electron. Lett., Mar. 2, 1978, pp. 157–158, vol. 14.

Uhrin, et al., *Growth of Large Diameter Nd:YAG Laser Crystals*, National Technical Information Service, Interim Progress Report, Contract No. DAAB 07–77–C–0375 (Apr. 1, 1980–Mar. 31, 1981).

Van Dover, et al., *Refractory–superconductor S–N–S microbridges*, Applied Physics Letters, Nov. 1980.

Villarruel and Moeller, *Fused single mode fibre access couplers*, Electronics Letters, 1981, pp. 243–244, vol. 17, No. 6.

Washio, K., et al., *Room–temperature cw operation of an efficient miniaturized Nd:YAG laser end pumped by a superluminescent diode*, Applied Physics Letters, Dec. 1976, pp. 720–772, vol. 29, No. 11.

Weidel, E., et al., *Tee Coupler for Single–Mode Fibres*, Electronics Letters, Nov. 1979, pp. 737–738, vol. 15, No. 23.

Williams, J. C., *Wavelength Division Multiplexing (WDM) Optical Couplers*, SPIE '82 Technical Digest, Fiber Optics Session 3, Jan. 1982.

J. Stone, et al. "Nd: YAG Single–Crystal Fiber Laser: Room Temperature cw operation using a single LED as an End Pump". *Applied Physics Letters*, vol. 29, No. 1, Jul. 1, 1976, pp. 37–39.

Stone and Burrus, "Neodymium–Doped Fiber Lasers: Room Temperature cw Operation With An Injection Laser Pump" *Applied Optics*, vol. 13, No. 6, Jun. 1974, pp. 1256–1258.

S.E. Miller and A.G. Chynoweth, Editors, "Neodymium Lasers" (Chapter 16) *Optical Fiber Telecommunications*, Academic Press, 1979, pp. 538–556.

Digonnet and Shaw, "Wavelength Multiplexing in Single–Mode Fiber Couplers", *Applied Optics*, (Feb. 1983), vol. 22, No. 3, pp. 484–491.

Winzer, G., "Wavelength Division Multiplexing—Status and Trends", (Sep. 1982), ECOC382, pp. 305–314.

Sorin, Jackson and Shaw, "Evanescent Amplification in a Single–Mode Optical Fiber", *Electronics Letters*, (Sep. 1983), vol. 19, No. 20, pp. 820–821.

Kawasaki, Hill and Lamont, "Biconical–Taper Single–Mode Fiber Coupler", *Optic Letters*, (Jul. 1981), vol. 6.

Lamouroux, Orszag, Prade and Vincent, "Continuous Laser Amplification in a Monomode Fiber Longitudinally Pumped by Evanescent Field Coupling", *Optic Letters*, (Sep. 1983), vol. 8, No. 9, pp. 504–505.

Burrus and Stone, Single–Crystal Fiber Optical Devices: A Nd: YAG Fiber Laser, *Applied Physics Letters*, (Mar. 1975), vol. 26, No. 6, pp. 318–320.

Barrekette, "Optical Waveguides and Integrated Optics", (Oct. 1971), *OSA Annual Mtg.*, Paper No. ThK12.

Digonnet and Shaw, "Nd: YAG Single Crystal Fiber Lasers", (Oct. 1983) *2nd Eur. Conf. on Int. Optics*, pp. 34–37.

Injeyan, Stafsudd and Alexopolous, "Light Amplification By Evanescent Wave Coupling in a Multimode Fiber", *Applied Optics* (Jun. 1982), vol. 21, No. 11.

Aoki, et al., "Efficient Backward and Forward Pumping CW Raman Amplification for InGaAsP Laser Light in Silica Fibres", *Electronics Letters*, Aug. 1983), vol. 19, No. 16, pp. 620–622.

Ross and Snitzer, "Optical, Amplification of 1.06ulnAsP Injection–Laser Emission", *Journal of Quantum Electronics*, (Jun. 1970), vol. QE–6, No. 6.

Koester, Laser Action by Enhanced Total Internal Reflection, *IEEE Journal of Quantum Electronics*, (Sep. 1966), vol. QE–2, No. 9, pp. 580–584.

Shibata et al., "Raman Effect in Optical Fiber Doped with Various Dopants", (Mar. 1980), ICCE Japan Mtg.

Giordmaine, J.A., "The Interaction of Light with Light", and corresponding Japanese Counterpart, Scientific American, vol. 210, No. 4, (Apr. 1964), pp. 38–49.

Ino et al., "Fabrication and Fundamental Properties of Nd: YAG Thin Film by RF Sputtering for Waveguide Type Optical Amplifier", (Nov. 1981), IED Tech. Res. Report.

Sakakuni Shimada et al., "Optical Fiber Transmission Technology", Information Process, (May 1977), vol. 18, No. 3, pp. 273–280.

H. Yanai, Optical Communication Handbook (1982), pp. 244–249.

Kao, Charles K. "Optical Fiber Systems: Technology, Design and Applications", *Table of Contents and Chapter Y*, (1982).

Parker, Sybil, "McGraw–Hill Dictionary of Scientific and Technical Terms", (Third Edition), Ed. (1984), pp. 376 and 1249.

Parriaux, O, et al., "Wavelength Selective Distributed Coupling Between Single Mode Optical Fibers for Multiplexing", *J. Opt. Commun.* 2 (1981) 3. 105–109.

Parriaux, O., et al., "Coupling and Multiplexing Between Single Mode Optical Fibers," Fiber–Optic Rotation Sensors and Related Technologies, Proceedings of the First International Conference, MIT, Cambridge, Mass., Nov. 9–11, 1981, Editors S. Ezekiel et al., pp. 144–148.

Digonnet, M.J.F., et al., "Single–mode Fiber Optic Wavelength Multiplexer", Fifth Optical Meeting on Optical Fiber Communication, Apr. 13–15, 1982 OSA/IEEE, Phoenix, AZ, Digest of Technical Papers, pp. 36–37 and 78–78 and 78–79.

Hammond, P.R., "Laser Dye DCM, Its Spectral Properties, Synthesis and Comparison with Other Dyes in the Red", *Optics Communications*, vol. 29, No. 3, Jun. 1979, pp. 331–333.

Kapany et al., "Coherent Interactions Between Opical Waveguides . . . ", J.O.S.A., vol. 58, No. 9, Sep. 1968.

Bergh et al., "Single Mode Fiber Optic Dirctional Coupler", Electronics Letters, vol. 16, 7, Mar. 27, 1980, pp. 260–261.

Periasamy et al., "Laser Amplification in an Optical Fiber by Evanescent Field Coupling", Appl. Physics, vol. 24, No. 3, Mar. 1981, pp. 201–203.

Alferov et al., "Multichannel Duplex Fiber–Optic Communication Line . . . ", Soviet J. Quant. Electr., vol. 12, No. 8, Aug. 1982, pp. 1088–1090.

Berkey, et al., "Single–mode fibers by the OVD process", Technical Digest, Topical meeting on Optical Fiber Communication, Optical Society of America, Washington, D.C. (1982), paper THCC5.

Chodorow, et al., *New Approaches to Optical Systems for Inertial Rotation Sensing*, Jan.1, 1980 to Dec. 31, 1980.

Edagawa, *Application of Fiber Amplifiers to Telecommunications Systems*, Rare Earth Doped Fiber Lasers and Amplifiers, pp. 563–647 (Michel J. F. Digonnet ed., 1993).

Giordmaine, *Characteristics and application of laser light*, Laser and Light 5 Laser II, Jan. 25, 1980, Kyoritsu Syuppan, Inc., pp. 27–52, Tokyo, Japan.

McIntyre, et al., *Power transfer between nonparallel and tapered optical fibers*, J. Opt. Soc. Am., Mar. 1974, pp. 285–288, vol. 64, No. 3.

Newton, et al., *Single mode fiber multiterminal directional coupler/tapped delay line*, Sixth Topical Meeting on Optical Fiber Communication, OFC '83, Feb. 28–Mar. 2, 1983, New Orleans, Louisiana.

Siegman, A., *Lasers* (University Science Books 1986) (ISBN 0-935702-11-3).

Siegman, A., *Annual Progress Report and Report of Significant Accomplishments*, Apr. 1, 1981 to Mar. 31, 1982.

Yeh, C., et al., *Accuracy of directional coupler theory in fiber or integrated optic applications*, J. Opt. Soc. Am., Aug. 1978, pp. 1079–1083, vol. 68, No. 8.

Youngquist and Shaw, *Asymmetric losses in directional couplers, effects on Sagnac and Mach Zehnder fiber interferometers*, SPIE Proceedings on Fiber Optic and Laser Sensors, 1983, pp. 252–255, vol. 412, SPIE, Washington.

*Research on New Approaches to Optical Systems for Inertial Rotation Sensing*, Sep. 1, 1981 to Apr. 30, 1982.

Bernd, et al., *Optical Amplification of 1.06-,μ InAsr,P Injection–Laser–Emission*, IEEE J. Quantum Electronics, vol. QE–6, No. 6 (Jun. 1970) pp. 351–356.

Birnbaum, et al., *Stimulated–Emission Cross–Section of $Nd^{3+}$ at 1.06 μ $POCl_3$, YAG, $CaWo_4$, ED–2 Glass and LG55 Glass*, J. Appl. Phys., vol. 43, No. 5 (May 1972).

Cutler, et al., *Limitation of rotation sensing by scattering*, Optics Letters 5, Nov. 1980, pp. 488–490, vol. 5, Issue 11.

Danielmeyer, *Progress in Nd:YAG lasers*, Laser 4, ed . Levine and De Maria, Marcel Dekker, Inc.

Digonnet, et al., *Diode Pumped Fiber Laser*, Interim Report to US AirForce (Jul. 1983) Contract F33615–82–C–1749.

Digonnet, *Passive and active fiber optic componets*, dissertation submitted to Stanford University, Sep. 1983.

Digonnet, "$Nd^3$+–and $Er^3$+–Doped Silica Fiber Lasers," *Rare Earth Doped Fiber Lasers and Amplifiers*, p. 238 (Digonnet, ed. 1993).

Fujita, et al., *Optical fiber wave splitting coupler*, Appl. Opt., Sep. 1976, pp. 2031–2033, vol. 15, No. 9.

Kapany, *Fiber Optics*, pp. 289–304 (1967).

Kapany, *Fiber Optics: Principles and Applications*, Academic Press, 1967, pp. 18–22.

Lengyel, *Lasers*, 2nd ed., John Wiley and Sons, 1971, pp. 120–132.

Marcuse, *Radiation losses of the dominant mode in round dielectric waveguides*, Bell Syst. Tech. J., 1970, pp. 1665–1693, vol. 49.

Marcuse, *Coupled mode theory of round optical fibers*, Bell Syst. Tech. J., 1973, pp. 817–842, vol. 52.

Snitzer, E., *Optical dielectric waveguides*, Advances in Quantum Electronics, 1961, pp. 348–369, New York: Columbia Univ. Press.

Stokes, et al., *All–single–mode fiber resonator*, Opt. Lett., 1982, pp. 288–, vol. 7.

Stone et al., *Self–Contained LED–Pumped Single–Crystal Nd:YAG Fiber Laser*, J. Opt. Soc. Am., 1977, p. 708, vol. 67.

Stone, et al. *Self Contained LED–Pumped Single–Crystal Nd:YAG Fiber Laser*, Crane, Russak and Co., Inc. (1979).

Yariv, A., *Quantum Electronics*, Second Edition, John Wiley and Sons, N.Y., 1975, pp. 181–184.

Youngquist, R. C., et al., *Effects of normal mode loss in dielectric waveguide directional couplers and interferometers*, IEEE J. Quant. Electron., to be published.

Definition of "coupler" Oxford English Dictionary, vol. 3, p. 1049, Clarendon Press 1989.

Definition of "coupler" Webster's New Collegiate Dictionary 258 (G & C Meriam Co. 1980).

Definition of "port" Data & Telecommunications Dictionary 568 (Julie K. Petersen, CRC Press 1999).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3–4 and 11–15 is confirmed.

Claims 1–2 and 5–6 were previously cancelled.

Claims 7–10 and 16–22 were not reexamined.

\* \* \* \* \*